United States Patent
Onishi et al.

(10) Patent No.: US 6,902,529 B2
(45) Date of Patent: *Jun. 7, 2005

(54) ENDOSCOPE APPARATUS

(75) Inventors: Junichi Onishi, Hachioji (JP); Keisuke Miura, Hacioji (JP); Kazuo Banju, Hachioji (JP); Koji Yamauchi, Koganei (JP); Hiroyuki Ushifusa, Tama (JP); Kazuhiro Gono, Sagamihara (JP); Taro Miyazawa, Hino (JP); Tomoyasu Kawai, Nakano-ku (JP); Katsumi Sasaki, Sumida-ku (JP); Takeaki Nakamura, Hino (JP)

(73) Assignee: Olympus Corporation, Tokyo (JP)

( * ) Notice: Subject to any disclaimer, the term of this patent is extended or adjusted under 35 U.S.C. 154(b) by 32 days.

This patent is subject to a terminal disclaimer.

(21) Appl. No.: 10/600,741

(22) Filed: Jun. 20, 2003

(65) Prior Publication Data

US 2004/0082834 A1 Apr. 29, 2004

Related U.S. Application Data

(63) Continuation of application No. 09/829,845, filed on Apr. 10, 2001, now Pat. No. 6,612,981.

(30) Foreign Application Priority Data

Apr. 10, 2000 (JP) .................................. 2000-108385
Feb. 15, 2001 (JP) .................................. 2001-38793

(51) Int. Cl.[7] ............................................... A61B 1/04
(52) U.S. Cl. ....................................... 600/118; 600/112
(58) Field of Search .......................... 600/109–118, 122, 600/101, 103; 128/903; 348/69; 385/117; 707/1, 10, 101, 104.1

(56) References Cited

U.S. PATENT DOCUMENTS

| 4,519,351 | A | 5/1985 | Archer |
| 4,633,304 | A | 12/1986 | Nagasaki |
| 5,361,203 | A | 11/1994 | Hiyama et al. |
| 5,527,261 | A | 6/1996 | Monroe et al. |
| 6,393,431 | B1 | 5/2002 | Salvati et al. |
| 2003/0233129 | A1 * | 12/2003 | Matos ........................... 607/5 |

FOREIGN PATENT DOCUMENTS

JP    60-48011    3/1985

* cited by examiner

Primary Examiner—Tu Hoang
(74) Attorney, Agent, or Firm—Scully, Scott, Murphy & Presser

(57) ABSTRACT

Endoscopes comprise image pickup elements for picking up images and transmission circuits and the like for transmitting the picked up images with radio waves of different frequencies. In addition, bar codes to code the frequencies used for transmission are provided to the respective endoscopes, the bar code provided to the endoscope used in endoscope inspection is read on a receiver side, and a reception frequency of a station selection unit is set to the read frequency, so that a signal obtained by a desired endoscope can be easily received and imaged even in case a plurality of endoscopes are used.

8 Claims, 26 Drawing Sheets

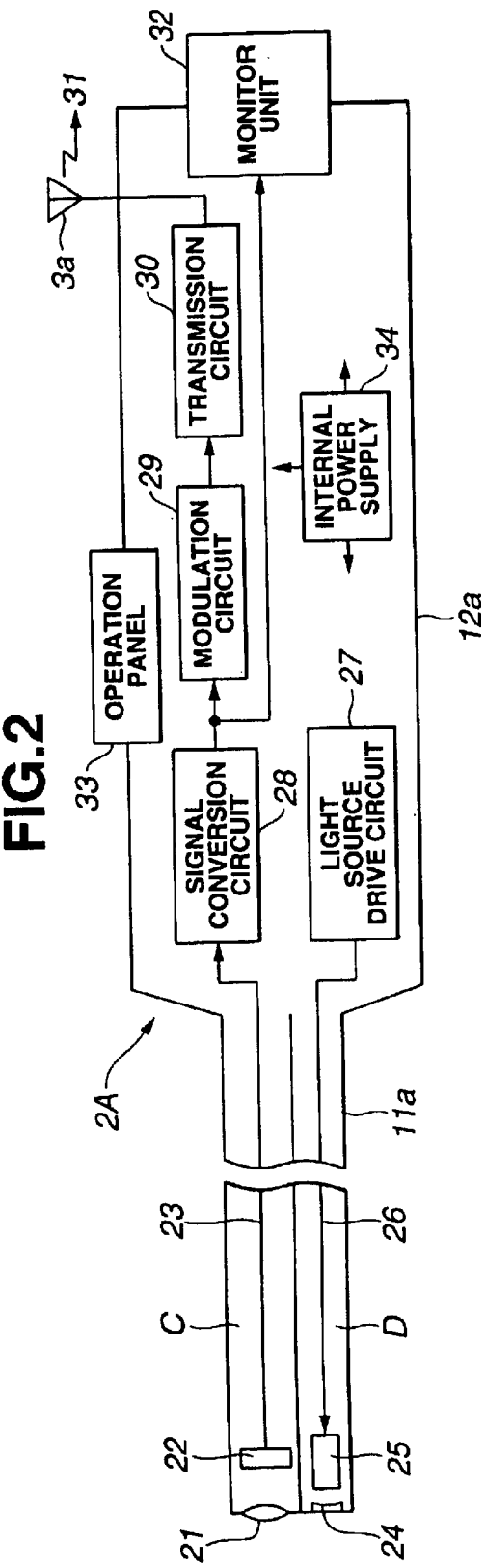
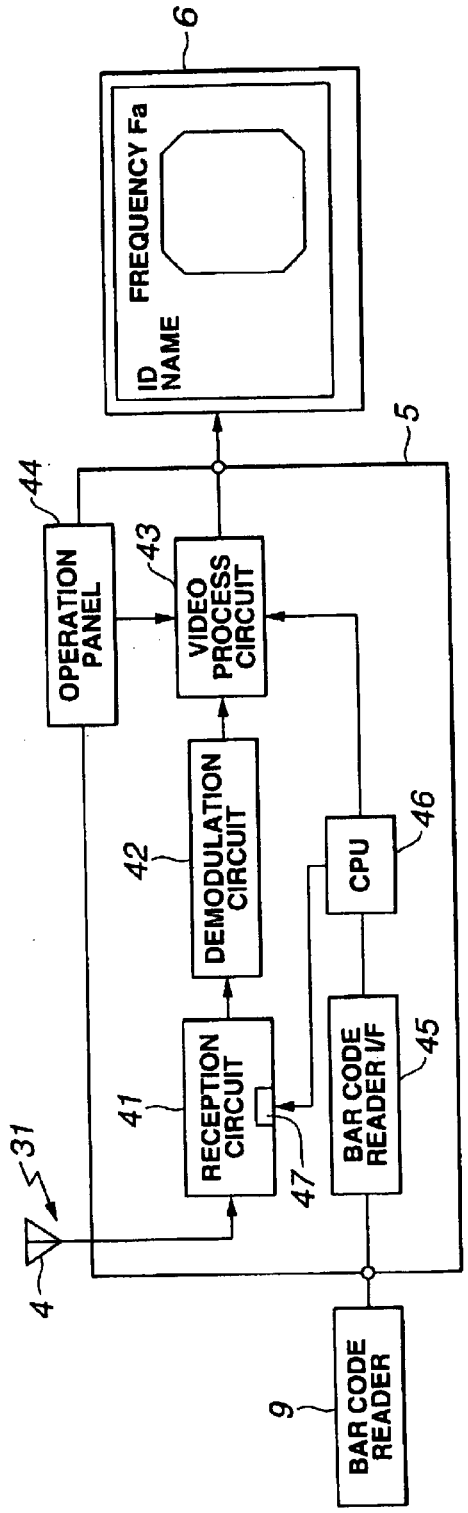

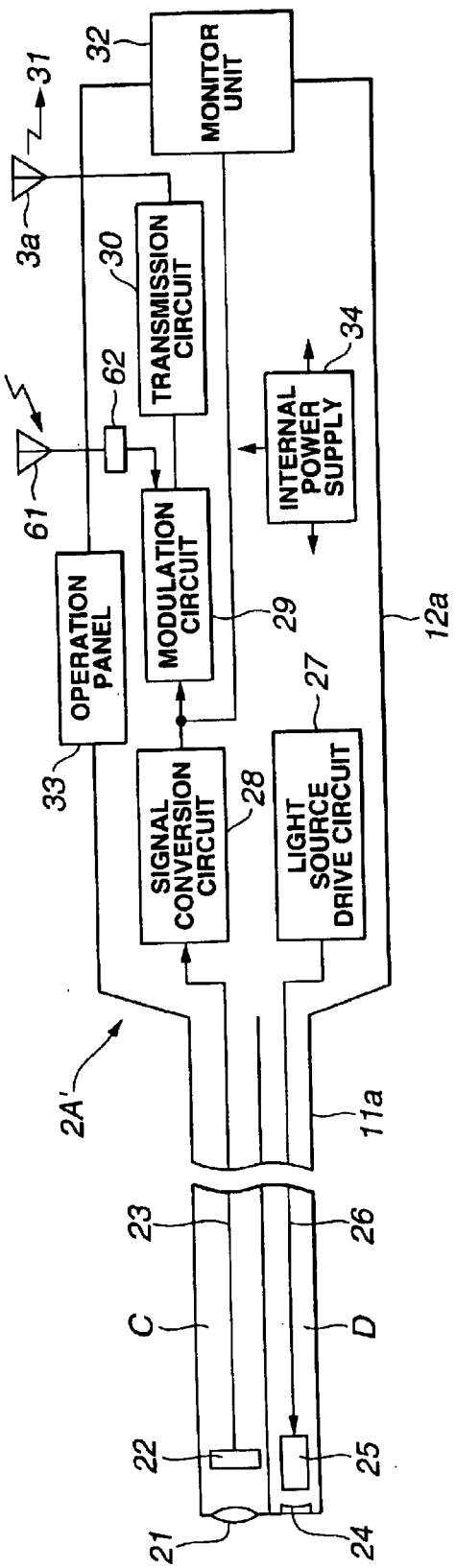
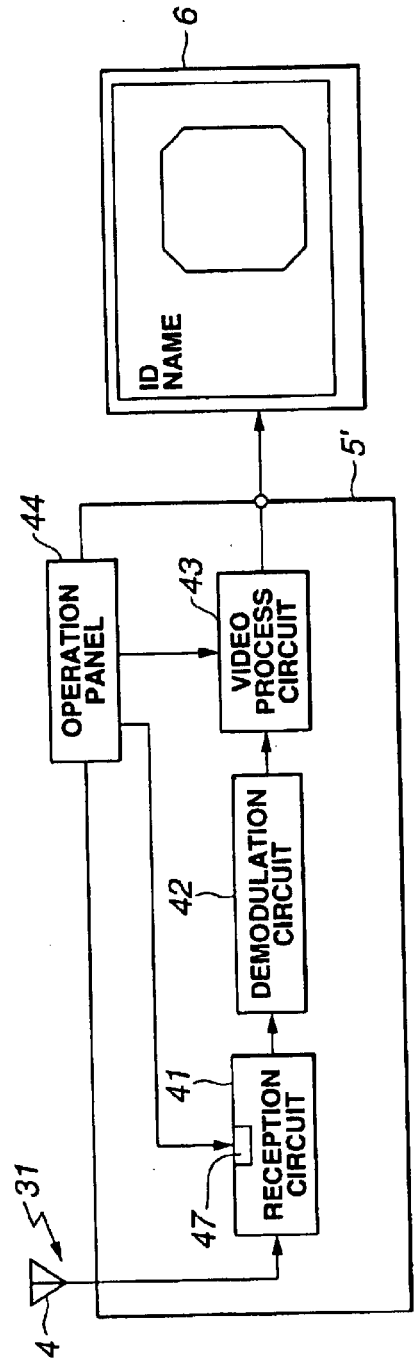

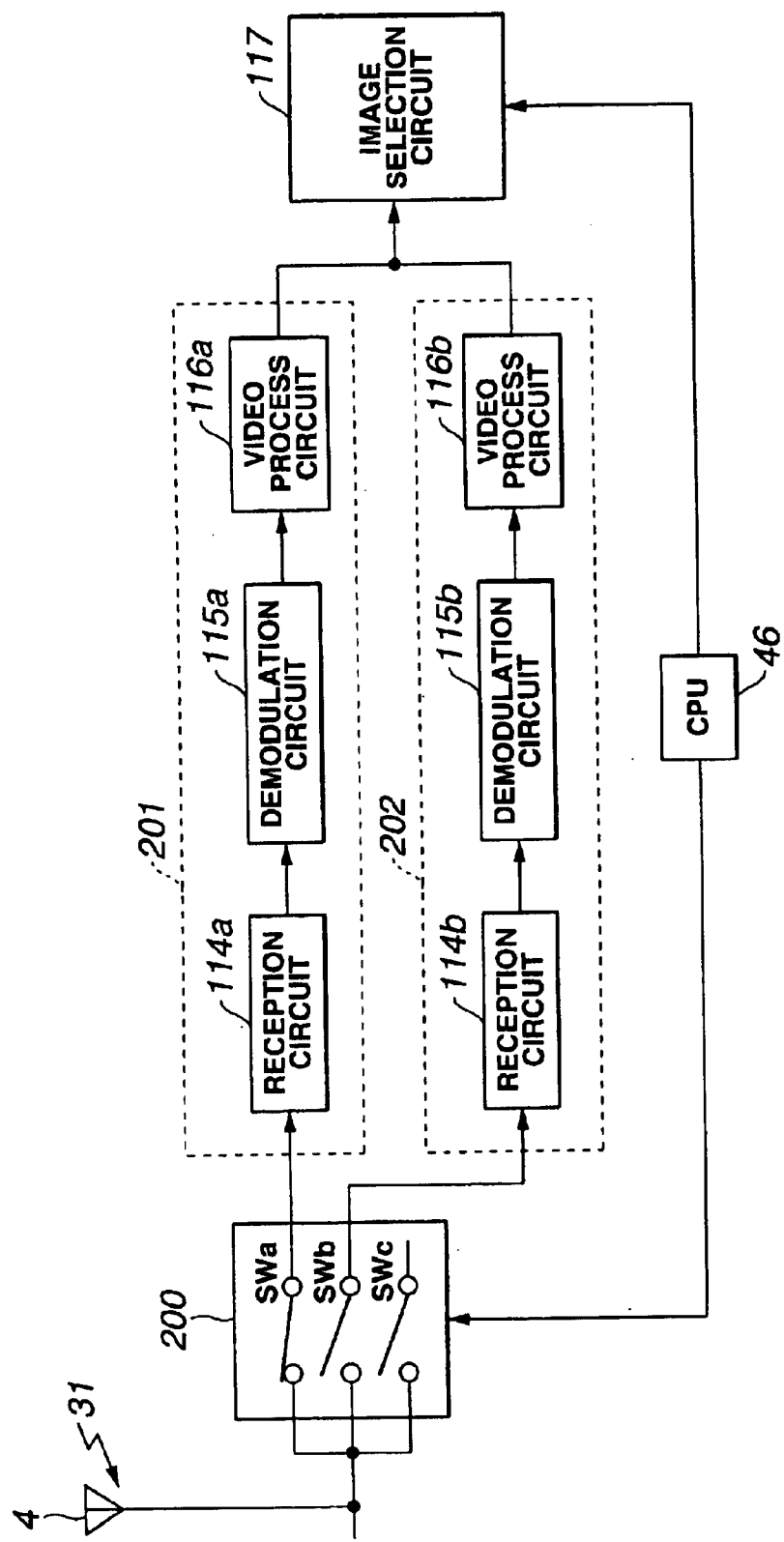

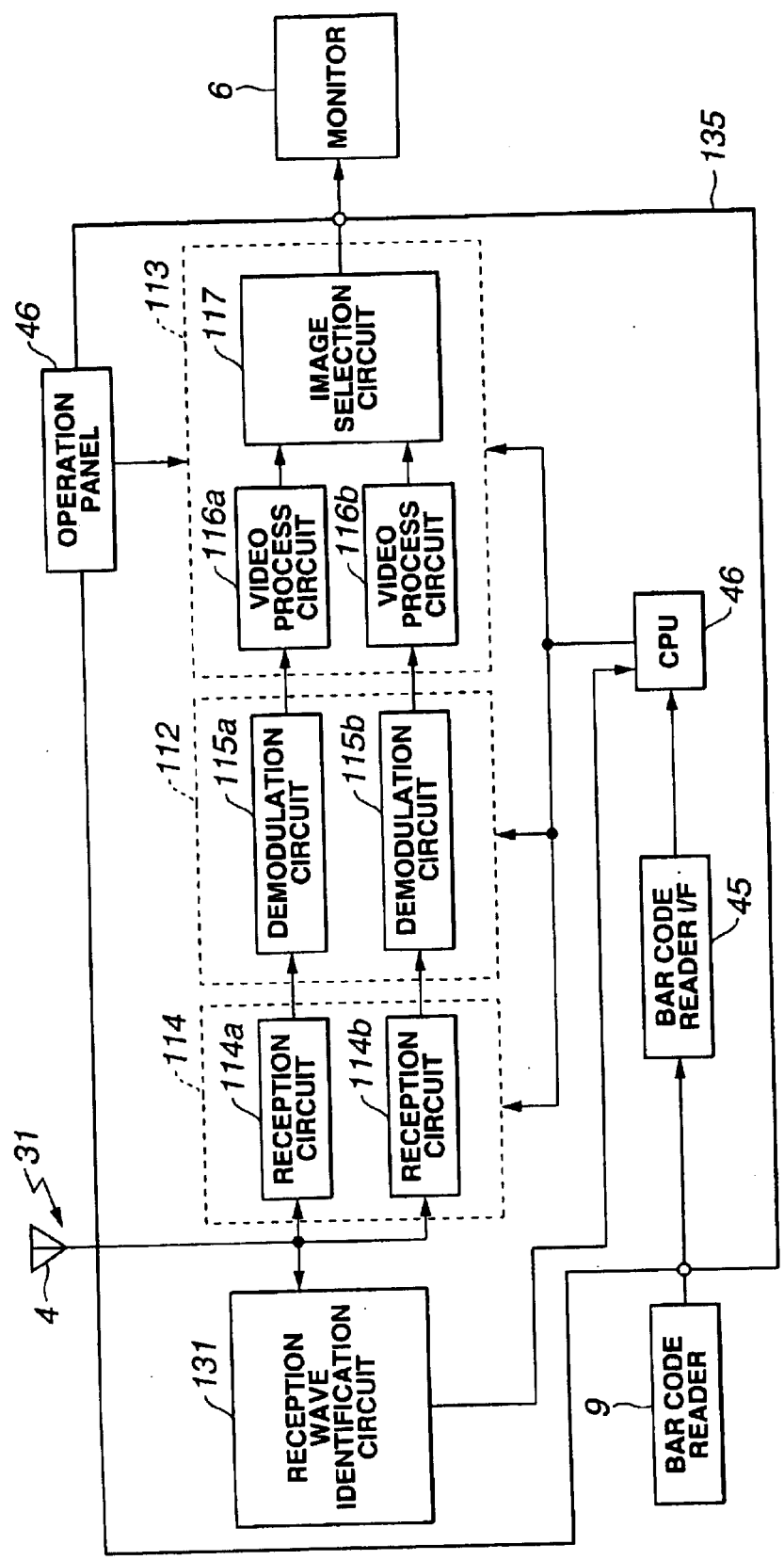

ENDOSCOPE APPARATUS

This application claims benefit of Japanese Application Nos. 2000-108385 filed in Japan on Apr. 10, 2000 and 2001-38793 filed in Japan on Feb. 15, 2001, the contents of which are incorporated by this reference. This application is a continuation application of U.S. patent application Ser. No. 09/829,845, filed on Apr. 10, 2001, now U.S. Pat. No. 6,612,981, the contents of which are incorporated by this reference.

BACKGROUND OF THE INVENTION

1. Field of the Invention

The present invention relates to an endoscope apparatus for displaying an endoscope image on a monitor on a receiver side by wireless.

2. Description of the Related Art

In recent years, an endoscope apparatus has been widely used in a medical field as well as in an industrial field. For example, Japanese Patent Application Laid-open No. Sho 60-48011 discloses an endoscope apparatus which can display an image of an endoscope on a monitor located at a distant position by transmitting the image by wireless.

However, since frequencies used in wireless transmission cannot be switched in the prior art, it is inconvenient in the prior art to selectively use a plurality of endoscopes.

In addition, it is impossible in the prior art to cope with a case in which a plurality of endoscopes are simultaneously used.

OBJECT(S) AND SUMMARY OF THE INVENTION

It is an object of the present invention to provide an endoscope apparatus which selectively uses a plurality of endoscopes and can transmit an image such that radio waves do not interfer with each other when the endoscopes are simultaneously used.

It is another object of the present invention to provide a convenient endoscope apparatus which can easily perform endoscope inspection.

It is still another object of the present invention to provide a convenient medical system which can easily perform medical inspection.

An endoscope apparatus comprises:

first and second endoscopes having insertion units inserted into a body cavity and image pickup devices for picking up images of an observation portion;

first and second wireless transmitters which are arranged in the first and second endoscopes respectively to transmit pieces of image information picked by the first and second endoscopes respectively and which transmit image information signals corresponding to the pieces of image information at different transmission frequencies respectively;

first and second information display portions which are arranged in the first and second endoscopes respectively and which display pieces of frequency information of the transmission frequencies of the first and second wireless transmitters;

an information reading device which can read the pieces of frequency information of the first and second display portions;

a wireless receiver which can receive the image information signals respectively transmitted from the first and second wireless transmitters;

a reception frequency setting unit for tuning a reception frequency of the wireless receiver to the transmission frequencies of respective image information signals transmitted from the first and second wireless transmitters by the pieces of frequency information read by the information reading device; and an image display device for processing the first or second image information signal received by the wireless receiver to display an image. In accordance with the endoscope apparatus, an information display portion of an endoscope used in endoscope inspection is read by the information reading device, thereby making it possible that the reception frequency of the wireless receiver is set so that the transmission frequency of the endoscope maybe received, and the endoscope apparatus can easily cope with even a case in which a plurality of endoscopes are selectively used.

BRIEF DESCRIPTION OF THE DRAWINGS

FIGS. 1 to 5 show a first embodiment of the present invention, wherein FIG. 1 is a diagram of the entire configuration of an endoscope apparatus according to the first embodiment, FIG. 2 is a block diagram showing the internal configuration of an endoscope, FIG. 3 is a block diagram showing the internal configuration of a receiver, FIG. 4 is a diagram showing a bar code reader device of a modified embodiment, and FIG. 5 is a flow chart for explaining an operation;

FIGS. 6 and 7 show a second embodiment of the present invention, wherein FIG. 6 is a block diagram showing the internal configuration of an endoscope according to the second embodiment, FIG. 7 is a block diagram showing the internal configuration of a receiver;

FIGS. 8 to 9B show a third embodiment of the present invention, wherein FIG. 8 is a diagram showing the entire configuration of an endoscope apparatus according to the third embodiment, and FIGS. 9A and 9B are diagrams showing the side surface and the front surface of a repeating unit respectively;

FIGS. 11 and 12 show a fifth embodiment of the present invention, wherein FIG. 11 is a diagram showing the entire configuration of an endoscope apparatus according to the fifth embodiment, and FIG. 12 is a diagram showing a movable reflection unit;

FIGS. 14 to 19 show a sixth embodiment of the present invention, wherein FIG. 14 is a block diagram showing the internal configuration of a receiver according to the sixth embodiment, FIG. 15 is a block diagram showing the internal configuration of a receiver unit and the like, FIG. 16 is a diagram showing a configuration of a switching means SW, FIG. 17 is a flow chart of an operation in this embodiment, FIG. 19 is a block diagram showing a part of the internal configuration of a receiver in a modified embodiment;

FIGS. 20 to 22 show a seventh embodiment of the present invention, wherein FIG. 20 is a block diagram showing the configuration of a receiver according to the seventh embodiment, FIG. 21 is a flow chart for explaining an operation, and FIG. 22 is a flow chart for explaining an operation in a modified embodiment;

FIGS. 23 and 24 show an eighth embodiment of the present invention, wherein FIG. 23 is a flow chart for explaining an operation in the eighth embodiment, and FIG. 24 is a diagram showing an example of the display of a message;

FIGS. 25 and 26 show a ninth embodiment of the present invention, wherein FIG. 25 is a block diagram showing the configuration of a part of a receiver in the ninth embodiment, and FIG. 26 is a flow chart for explaining an operation;

FIGS. 27 to 29 show a tenth embodiment of the present invention, wherein FIG. 27 is a diagram showing the entire configuration of an endoscope apparatus according to the tenth embodiment, FIG. 28 is a block diagram showing the internal configuration of a major part in FIG. 27, and FIG. 29 is a flow chart for explaining an operation, FIGS. 30 and 31 show an the eleventh embodiment of the present invention, wherein FIG. 30 is a diagram showing the entire configuration of a microscope apparatus used for operation in the eleventh embodiment, and FIG. 31 is a block diagram showing the configuration of a wireless transmitter.

DETAILED DESCRIPTION OF PREFERRED EMBODIMENTS

[First Embodiment]

The first embodiment of the present invention will be described below with reference to FIGS. 1 to 5.

Figure 1:
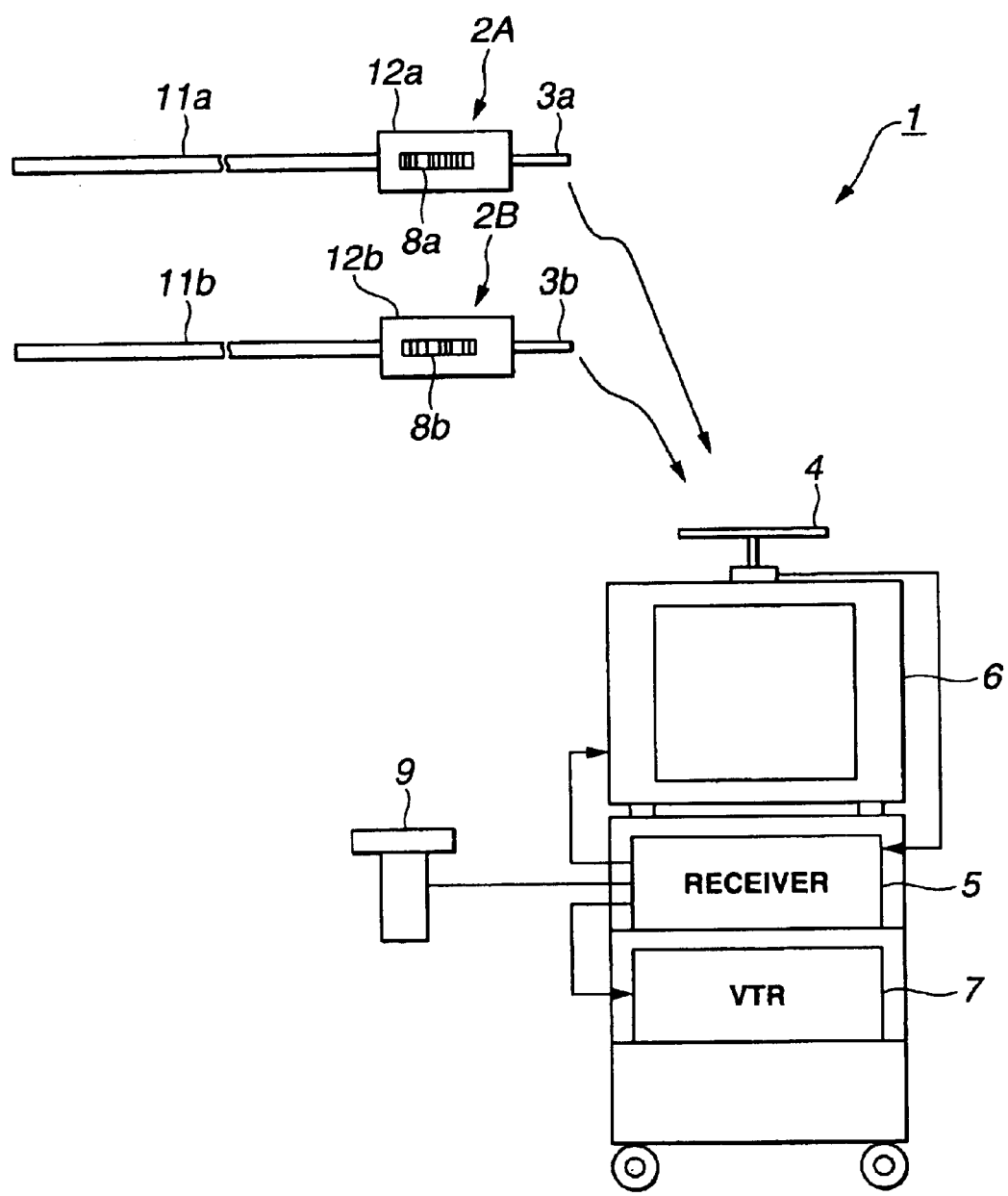

As shown in FIG. 1, an endoscope apparatus 1 according to the first embodiment of the present invention is composed of, for example, two endoscopes 2A and 2B having built-in image pickup elements respectively, a receiver (image receiver) 5 for receiving a signal transmitted from one of antennas 3a and 3b mounted respectively to the endoscopes 2A and 2B by an antenna 4 to generate a video signal, a monitor 6 for displaying the video signal generated by the receiver 5, a VTR 7 for recording the video signal, and a bar code reader 9 connected the receiver 5 for reading bar codes 8a and 8b respectively provided to the endoscopes 2A and 2B.

The endoscopes 2A and 2B have elongate insertion units 11a and 11b and operation units 12a and 12b respectively provided at the rear ends of the insertion units 11a and 11b and gripped and operated by an operator. For example, transmission antennas 3a and 3b are provided respectively at the rear ends of the operation units 12a and 12b. For example, the bar codes 8a and 8b with pieces of bar code information to which pieces of information of wireless frequencies (transmission frequencies) to be transmitted are converted are provided to the outer surfaces of the operation units 12a and 12b respectively.

In the endoscopes 2A and 2B, frequencies used in transmission are set to be of different values respectively, and the values are written in the bar codes 8a and 8b. The bar codes 8a and 8b are read with the bar code reader 9, so that the pieces of information of the frequencies can be identified.

FIG. 2 shows the internal configuration of the endoscope 2A. The endoscope 2A is composed of the insertion unit 11a and the operation unit 12a, and the insertion unit 11a consists of metal or flexible material. The insertion unit 11a has an inside which is partitioned into two portions C and D. One of two portions is an image pickup side C, and the other is a light source side D.

The image pickup side C of the insertion unit 11a comprises an image pickup lens 21 arranged at the distal end thereof. The image pickup side C is designed such that an optical image entering through the image pickup lens 21 is received by an image pickup element 22 such as CCD, and an electric signal obtained by subjecting the optical image to photoelectric conversion is transmitted to an electric circuit in the operation unit 12a through a signal lead 23. The light source side D of the insertion unit 11a comprises an illumination lens 24 arranged at the distal end thereof. The light source side D is designed such that light is irradiated from a light source unit 25 arranged behind the illumination lens 24 to a portion to be observed.

The light source unit 25 is constituted by an LED or a lamp, and is connected to a light source drive circuit 27 in the operation unit 12a through a lead wire 26. In addition, a signal conversion circuit 28, a modulation circuit 29, and a transmission circuit 30 are arranged in the operation unit 12a. The electric signal from the image pickup element 22 is converted to a video signal by the signal conversion circuit 28. Then, the video signal is modulated by the modulation circuit 29 and transmitted to the transmission circuit 30, so that the signal may be transmitted as a radio wave 31 from the antenna 3a.

A compact monitor unit 32 such as a liquid crystal monitor is connected to the signal conversion circuit 28, and an operation panel 33 is connected to the monitor unit 32. The operation panel 33 comprises an input device such as a keyboard, a button for shutter release, a freeze button for operating a frame memory of the receiver to display a still image, and the like.

The light source drive circuit 27, the signal conversion circuit 28, the modulation circuit 29, the transmission circuit 30 and the monitor unit 32 are connected to an internal power supply 34 such as a battery and provided with an operation power thereto. The monitor unit 32 is not necessarily disposed, and these circuits may also be driven by using an external power supply in place of the internal power supply 34.

In the endoscope 2A constituted as described above, the insertion unit 11a is inserted into a cavity or a hollow part of a living body, and light irradiated from the light source unit 25 is reflected on the portion to be observed, whereupon the light is received by the image pickup element 22. In the signal conversion circuit 28, the image of the light received by the image pickup element 22 is modulated to a high-frequency signal, and the modulated high-frequency signal is amplified by the transmission circuit 30 to be transmitted from the antenna 3a.

The endoscope 2B has the same structure as described above. However, the transmission frequencies of the endoscopes 2A and 2B are set to be different from each other, and the pieces of information thereof are expressed as the bar codes 8a and 8b. More specifically, respective endoscopes 2A and 2B comprise frequency information holding means so that they may have the pieces of information of frequencies used in the transmission. The receiver 5 (to be described later) has an information reading means for reading frequency information of the frequency information holding means. A reception frequency is set by the information read by the information reading means, so that the receiver 5 can easily receive images from the endoscopes 2A and 2B respectively.

FIG. 3 shows the internal configuration of the receiver 5.

In the receiver 5, when the radio wave 31 is incident on the antenna 4, the radio wave 31 is selectively amplified by a reception circuit 41 and converted to a video signal by a demodulation circuit 42. The video signal is supplied to a video process circuit 43, so that an endoscope image picked up by the image pickup element 22 is displayed on the monitor 6. An operation panel 44 is connected to the video process circuit 43, so that the same operation as that of the operation panel 33 of the endoscope 2A (or 2B) can be performed.

The bar code reader 9 serving as information reading means is connected to a CPU 46 through a bar code reader interface (to be referred to simply as a bar code reader I/F) 45 arranged in the receiver 5, and the CPU 46 controls a reception frequency of a (reception frequency) station selection unit 47 of the receiving circuit 41 with the information of a frequency read by the bar code reader 9, to set it to the frequency read by the bar code reader 9.

It is also displayed on the monitor 6 through the video process circuit 43 that the above setting is performed (for example, as shown in FIG. 3, a (reception) frequency Fa is displayed outside a display area for an endoscope image).

The receiving circuit 41 in the receiver 5 comprises the station selection unit 47 which can select at least the transmission frequency of the endoscope 2A and the transmission frequency of the endoscope 2B.

Figure 4:
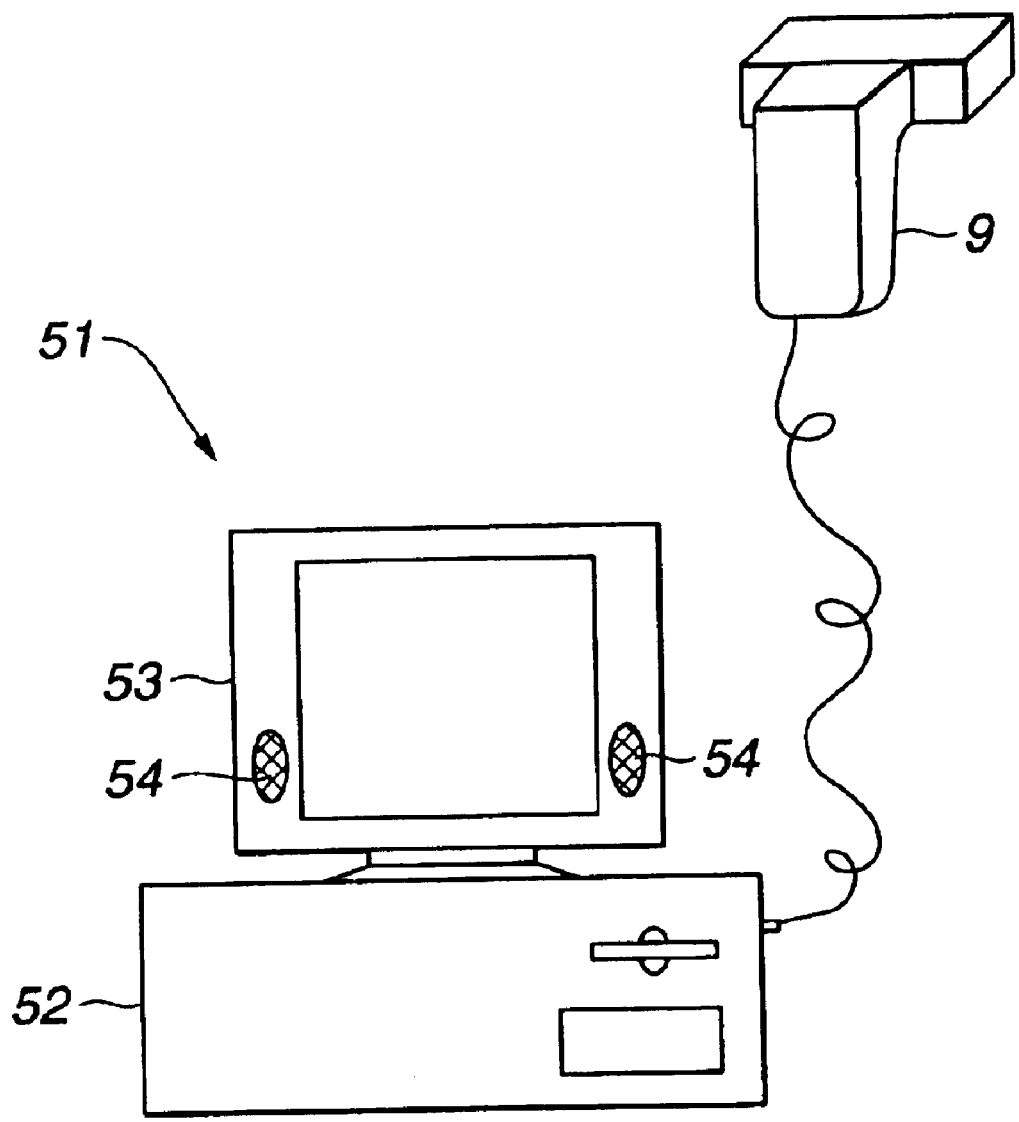

Although, in this embodiment, the bar code reader 9 is connected to the receiver 5, an arrangement of a bar code reader device 51 which can be separate as shown in FIG. 4 may be used.

The bar code reader device 51 is composed of the bar code reader 9, a main body 52, a monitor 53, and a set of speakers 54. The bar code reader 9 reads the bar code 8a of the endoscope 2A to recognize a frequency used by the endoscope 2A in the main body 52. Then, the recognized frequency information is transmitted to the CPU 46 in the receiver 5 through a cable (not shown) connected to the main body 52.

In order to confirm that the bar code reader 9 has correctly read the bar code 8a, visual notification can be performed with the monitor 53, or auditory notification can be performed with the set of speakers 54.

The monitor 53 and the set of speakers 54 are not necessarily provided. Similarly, the bar code 8b of the endoscope 2B is read and recognized. Thus, frequencies as many as used are recognized.

Figure 5:
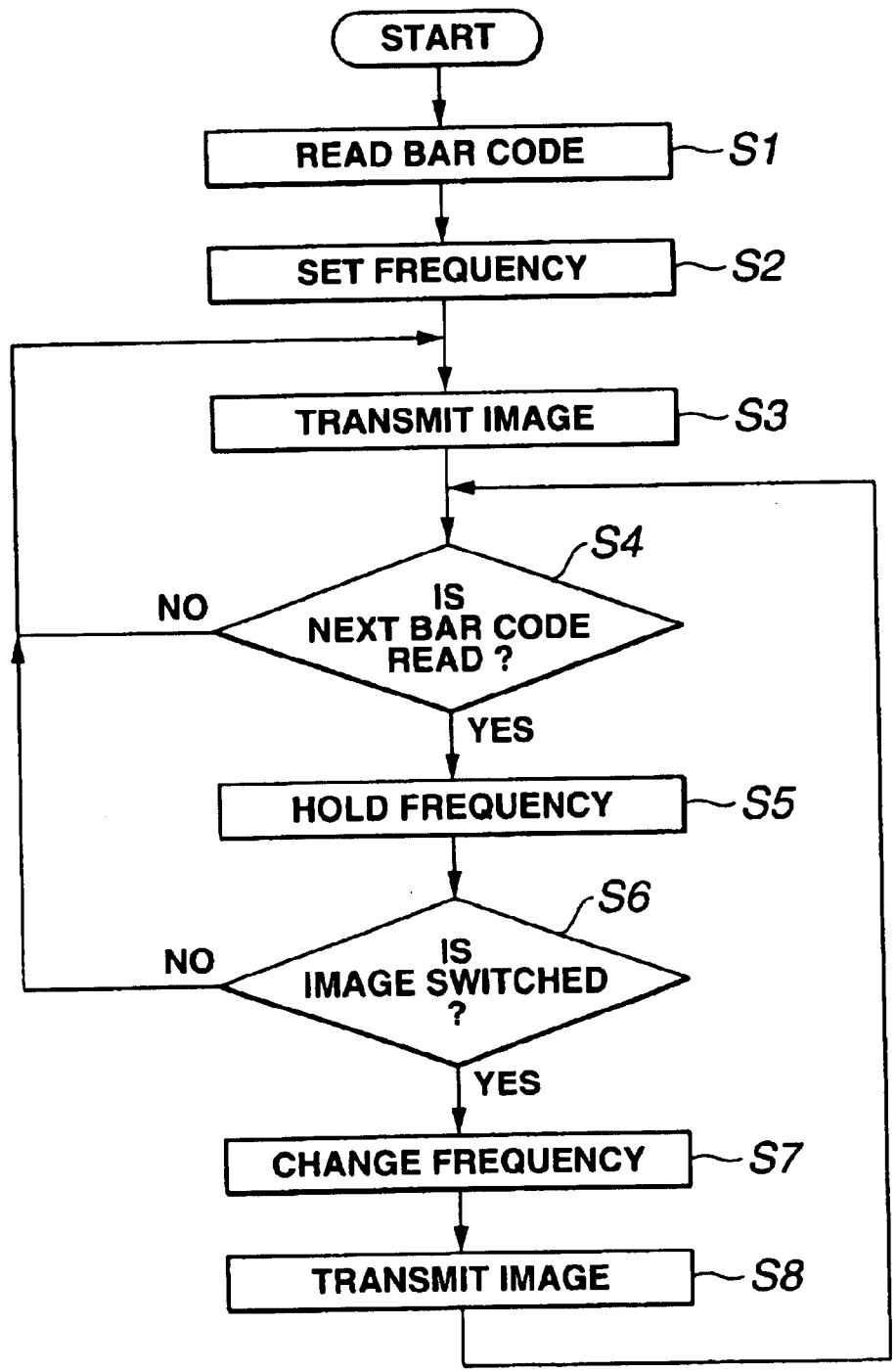

FIG. 5 is a flow chart showing the contents of operation in this embodiment.

When a power supply is turned on to start an operation, a bar code is read as shown in step S1. More specifically, the bar code 8a of the endoscope (e.g., 2A) to be used is read with the bar code reader 9.

When this reading operation is performed, a frequency setting in step S2 is performed. More specifically, frequency information read by the bar code reader 9 is transmitted to the CPU 46 shown in FIG. 3, and the CPU 46 sets the reception frequency of the station selection unit 47 of the receiving circuit 41 to the frequency thus read.

Then, image transmission in step S3 is performed. More specifically, a signal obtained by an image pickup operation performed by the endoscope 2A is converted through the transmission circuit 30 to a signal which can be transmitted with a radio wave, and the signal is transmitted from the antenna 3a, whereupon, the receiver 5 sets the frequency of the station selection unit 47 to a reception frequency equal to the transmitted frequency. The transmitted radio wave 31 is received by the antenna 4, converted to a video signal by the video process circuit 43, and displayed on the monitor 6. That is to say, the transmitted image information is transmitted to the receiver 5 side and displayed on the monitor 6.

It is decided in the next step S4 whether the next bar code is read or not. If the next bar code is not read, the image transmission is continuously performed in the previous state. If the next bar code is read, the frequency of the read bar code is held in step S5.

For example, when the bar code 8b of the next endoscope 2B is read by the bar code reader 9, the frequency information is held in an internal register or the like of the CPU 46. When YES is input to the decision of image switching in the next step S6, the CPU 46 changes the reception frequency of the station selection unit 47 by the information held in the register or the like thereof, so that a change in frequency in step S7 is performed. That is to say, the reception frequency of the station selection unit 47 in the receiver 5 is changed to the frequency in step S5.

In this manner, image transmission in step S8 is performed in a state in which the endoscope 2B is used at the frequency. Thereafter, the flow returns to step S4.

On the other hand, it is decided in step S6 whether image switching is performed or not. If NO in step S6, the data held in the CPU 46 is wasted, so that the flow returns to step S3 to maintain the previous image transmission.

According to the embodiment which operates as described above, by using the plurality of endoscopes 2A and 2B, the reception frequency of the receiver 5 can be freely changed and set to the transmission frequency of the endoscope 2A or 2B read by the bar code reader 9. The image of arbitrary one of the endoscopes 2A and 2B can be displayed on the monitor 6.

More specifically, even though the plurality of endoscopes 2A and 2B are simultaneously used, the image of arbitrary one of the endoscopes 2A and 2B can be advantageously displayed on the monitor 6 without interfering of the respective radio waves with each other.

The reception frequency can be simply and rapidly set in comparison with a manual setting, so that any operation can be rapidly performed. In addition, the operation can also be advantageously performed without erroneously setting the reception frequency. That is to say, the convenience in using the apparatus can be improved.

Although the bar codes 8a and 8b are provided to the endoscopes 2A and 2B in the above description, other frequency information holding means may be used.

Figure 27:
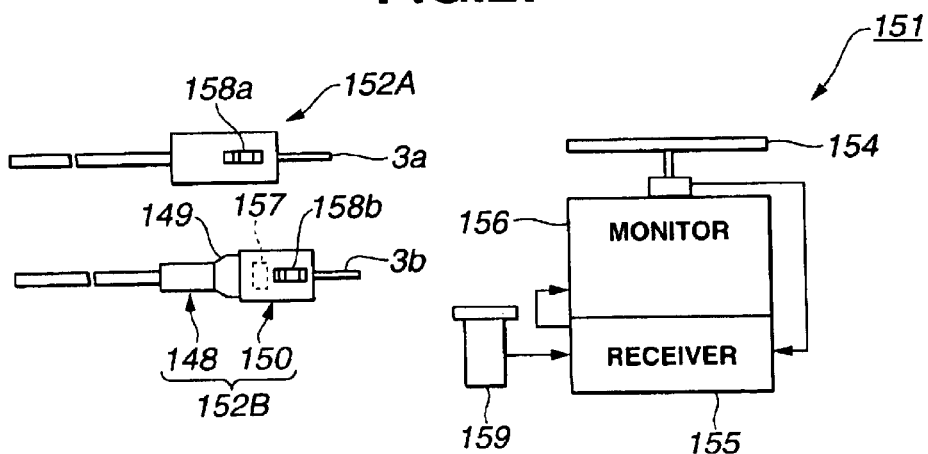

In addition, in the above description, electronic endoscopes each of which arranges an image pickup element at the distal end of an insertion unit have been described as the plurality of endoscopes. However, the embodiment is not limited to such configuration, and, for example, the embodiment can be applied to a television camera mounted type endoscope obtained by mounting a television camera having a built-in image pickup element to an optical endoscope. In this case, a bar code may be provided to the television camera. FIG. 27 shows such an endoscope 152B as described above.

[Second Embodiment]

The second embodiment of the present invention will be described below with reference to FIGS. 6 and 7. In this embodiment, a plurality of transmission frequencies are set in advance such that transmission to the plurality of endoscopes is performed at the transmission frequencies. A radio wave transmitted by another endoscope is monitored, and transmission is performed at a frequency different from a frequency in use, so that interference which may occur when equal frequencies are used can be prevented.

FIG. 6 shows the internal constitution of one endoscope 2A' in the second embodiment.

This endoscope 2A' comprises, in addition to the components of the endoscope 2A shown in FIG. 2, a second antenna 61 and a transmission (frequency) control circuit 62 which receives a radio wave of another endoscope (referred to as 2B') by this antenna 61 and changes and controls an oscillation frequency (carrier frequency) of a modulation circuit 29 to transmit the oscillation frequency.

The endoscope 2A' can perform transmission at a plurality of frequencies together with the other endoscope 2B'. The endoscope 2A' receives the transmission frequency of the other endoscope through the antenna 61 so as to perform transmission at a frequency different from the transmission frequency of the other endoscope.

The remaining constitution of the endoscope 2A' is the same as that of the endoscope 2A in the first embodiment. The same reference numerals as in the endoscope 2A denote the same parts in the endoscope 2A', and a description thereof will be omitted. FIG. 7 shows the internal configuration of a receiver 5'.

The receiver 5' has a structure in which the bar code reader I/F 45 and the CPU 46 are removed from the receiver 5 shown in FIG. 3. The receiver 5' is designed such that a setting of a reception frequency of a station selection unit 47 of a reception circuit 41 can be operated from an operation panel 44. The remaining constitution of the receiver 5' is the same as that of the receiver 5. The same reference numerals as in the receiver 5 denote the same parts in the receiver 5', and a description thereof will be omitted.

The function of this embodiment will be described below.

In the endoscope apparatus constituted as described above, an insertion unit 11a is inserted into a cavity or a hollow part of a living body, and light irradiated from a light source unit 25 is reflected on a portion to be observed, whereupon, the light is received by an image pickup element 22. In a signal conversion circuit 28, the image of the light received by the image pickup element 22 is modulated to a high-frequency signal, and the modulated high-frequency signal is amplified by a transmission circuit 30 to be transmitted from an antenna 3a.

This endoscope 2A' also receives a radio wave from the other endoscope 2B' through the antenna 61, so that the transmission frequency thereof is monitored by the transmission control circuit 62. An oscillation frequency (i.e., transmission frequency) for modulation in a modulation circuit 29 is controlled so that a frequency different from the frequency used in the endoscope 2B' may be used.

For example, when the transmission frequency of the endoscope 2B' is represented by Fb, the oscillation frequency is set to be, e.g., a transmission frequency Fa different from the transmission frequency Fb.

Therefore, even though the plurality of endoscopes 2A' and 2B' are used, the endoscopes use transmission frequencies which are different from each other. For this reason, transmission can be performed without interference between radio waves.

On the other hand, in the receiver 5', when a radio wave 31 is incident on the antenna 4, the radio wave 31 is selectively amplified by the receiving circuit 41, converted to a video signal by a demodulation circuit 42, and displayed on a monitor 6 through a video process circuit 43.

In this case, the frequency of the station selection unit 47 is selected from the operation panel 44, so that the signal of the endoscope 2A' or 2B' can be selected. Thus, the endoscope image of the selected frequency can be displayed on the monitor 6.

Also in this embodiment, even though the plurality of endoscopes 2A' and 2B' are used, the transmission frequencies different from each other are used. For this reason, transmission can be performed without interference between radio waves, and an image of any one of the endoscopes 2A' and 2B'can be freely received on the receiver 5' side and displayed on the monitor 6. In addition, transmissions can be prevented from being performed at equal frequencies without fail, and the process of setting transmission frequencies can be omitted.

[Third Embodiment]

The third embodiment of the present invention will be described below with reference to FIGS. 8 and 9. This embodiment is an endoscope apparatus using optical communication.

Figure 8:
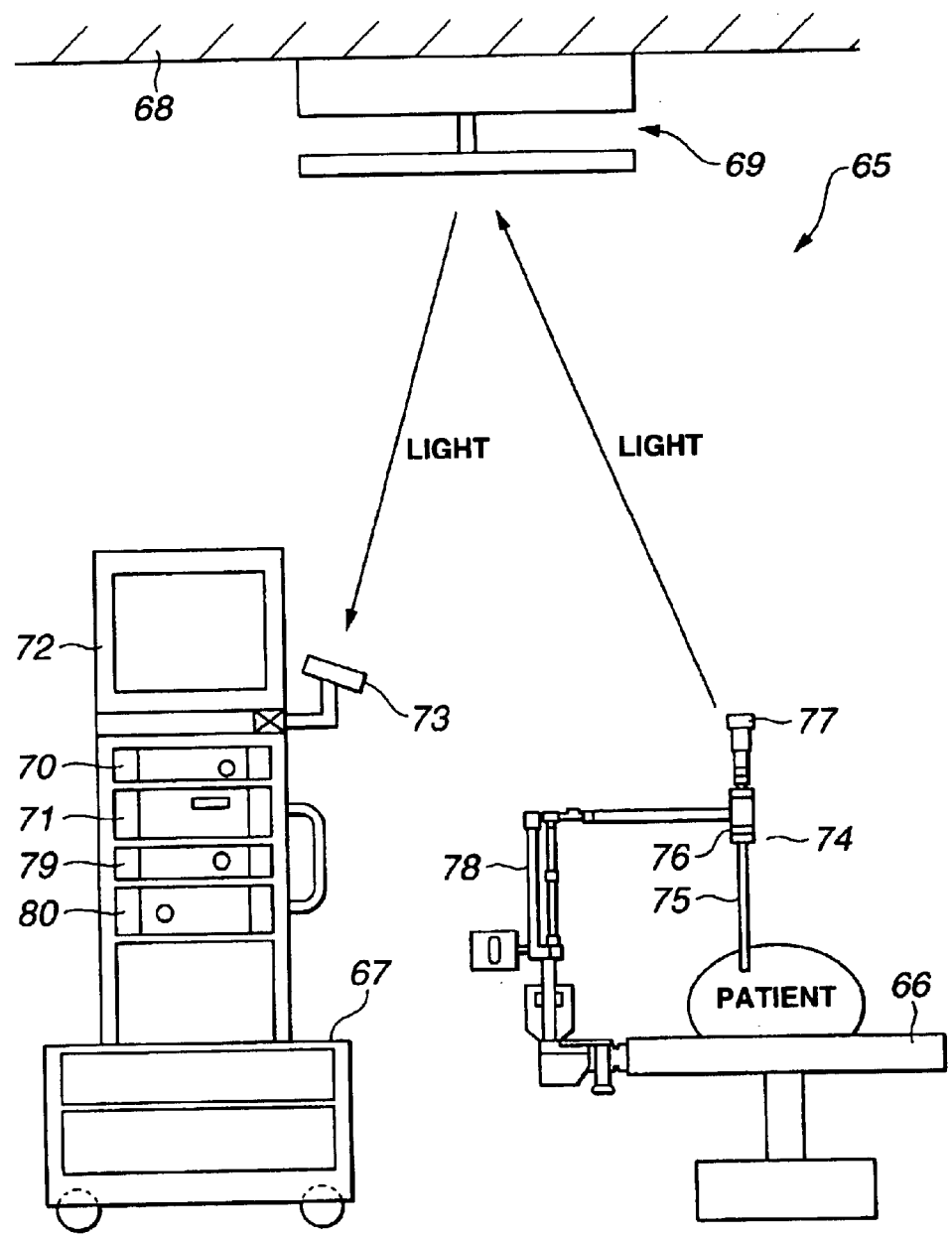

In an endoscope apparatus 65 using optical communication shown in FIG. 8, endoscope peripheral devices are mounted on a cart 67 arranged beside an operation bed 66 in which a patient lies. On a ceiling 68, a repeating unit 69 for optical communication is arranged.

On the cart 67, an endoscope camera device 70, a VTR 71, a monitor 72, and an optical communication receiver 73 are mounted.

An endoscope 74 for performing endoscope inspection for the patient is composed of an insertion unit 75 and a main body (operation unit) 76. An optical communication transmission device 77, a light source, an image pickup device, and a battery (which are not shown) are arranged at, e.g., the rear end of the main body 76. The endoscope 74 is held by an endoscope holder 78.

The insertion unit 75 of the endoscope 74 is inserted into a body cavity of the patient, and the image of a tissue illuminated with the light source can be obtained by the image pickup device. The image is emitted by the optical communication transmission device 77. The emitted light is received by the optical communication receiver 73 through the repeating unit 69.

The received signal is transmitted to the endoscope camera device 70 to be converted to an image signal. The image signal can also be recorded by the VTR 71 and can also be displayed on the monitor 72. An operation using a gas insufflator 79 or a high-frequency operating power supply 80 can also be performed.

Figure 9A:
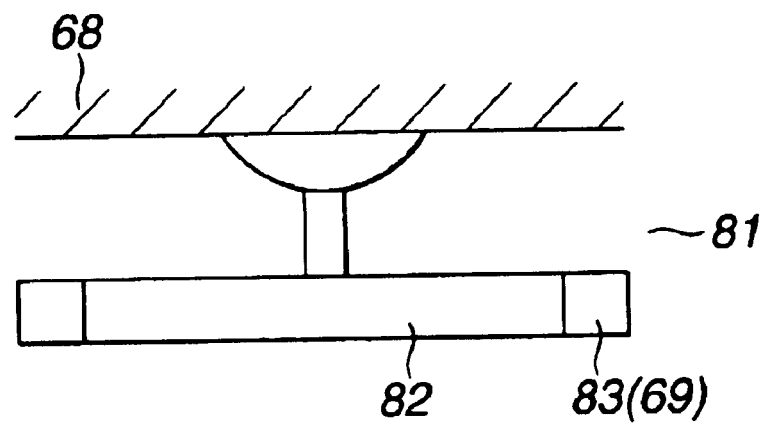
Figure 9B:
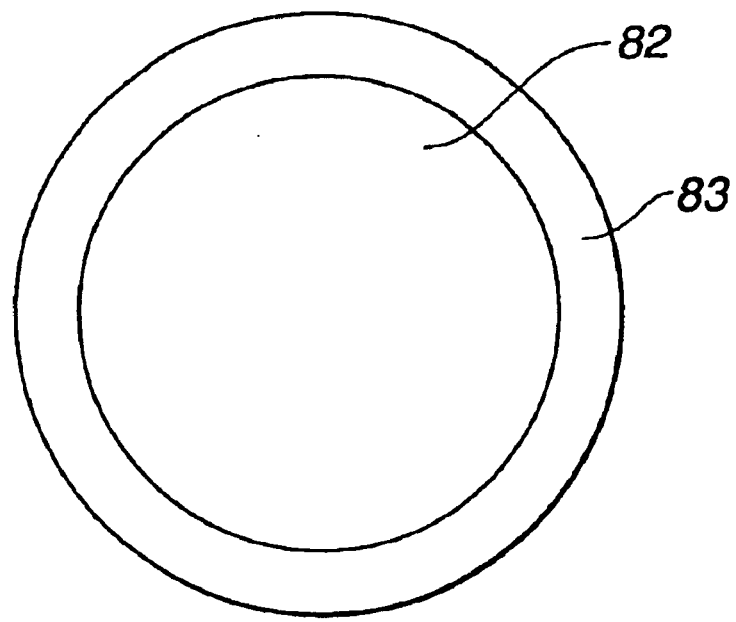

FIG. 9 shows the repeating unit 69. FIG. 9A is a side view, and FIG. 9B is a front view.

The repeating unit 69 is integrated with an astral lamp 81 disposed on the ceiling 68. An illumination device 82 is formed in the astral lamp 81. A ring-like reflection plate 83 for reflecting an optical signal is arranged around the illumination device 82 to constitute the repeating unit 69.

According to this embodiment, when optical communication is performed from the optical communication transmission device 77 to the optical communication receiver 73, even if an operator is an obstruction to the optical communication, a communication path which is not adversely affected by the obstruction can be assured by the repeating unit 69 arranged above, thereby to perform optical communication.

In case the signal received by the optical communication device 73 is weak, the strength of the signal received by the optical communication device 73 may be increased by changing the inclination or the like of the repeating unit 69.

[Fourth Embodiment]

The fourth embodiment will be described below with reference to FIG. 10. This embodiment also shows an endoscope apparatus using optical communication.

Figure 10:
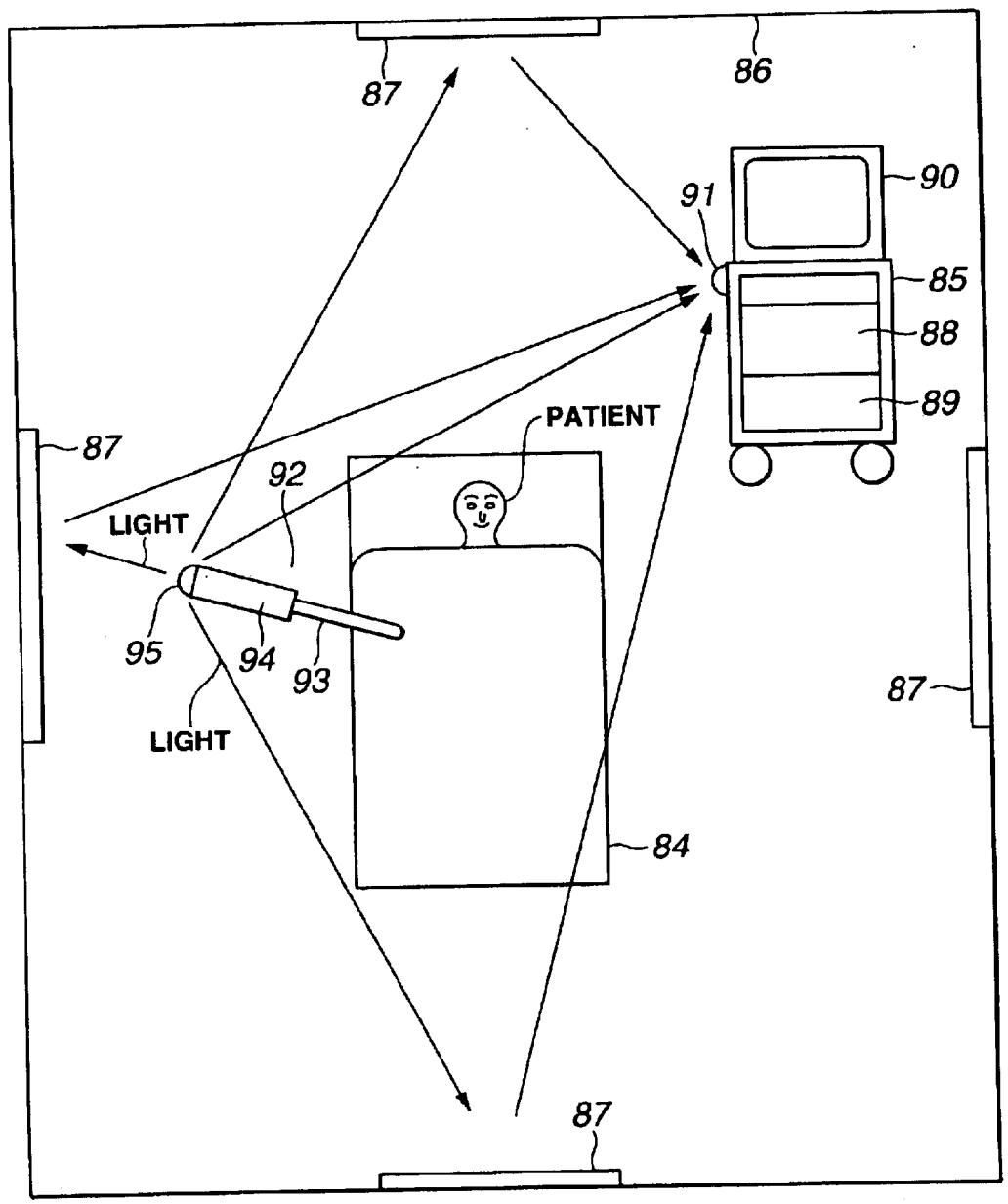
FIG. 10 is a diagram showing the entire configuration of an endoscope apparatus according to a fourth embodiment of the present invention.

As shown in FIG. 10, endoscope peripheral devices are mounted on a cart 85 arranged beside an operation bed 84 in which a patient lies. On the surface of a wall 86, a plurality of reflection units 87 for optical communication are arranged.

On the cart 85, an endoscope camera device 88, a VTR 89, a monitor 90, and an optical communication receiver 91 are mounted.

An endoscope 92 is composed of an insertion unit 93 and a main body 94. An optical communication transmission device 95, a light source, an image pickup device, and a battery (which are not shown) are provided to the main body 94.

The insertion unit 93 of the endoscope 92 is inserted into a body cavity of the patient, and an image of a tissue illuminated with the light source can be obtained by the image pickup device. The image is emitted in a plurality of directions by the optical communication transmission device 95. The emitted light arrives at the optical communication receiver 91 directly or by way of the reflection units 87 arranged on the wall.

According to this embodiment, the reflection units 87 are arranged such that the transmission means using optical communication can transmit an optical signal in a plurality of directions and the reception means using optical communication can receive the optical signal from a plurality of directions. Hence, even if one communication path is obstructed, optical communication can be performed by way of other communication paths.

Therefore, an operator and the like can move without regard to the positions of the transmission means and the reception means.

[Fifth Embodiment]

The fifth embodiment will be described below with reference to FIGS. 11 and 12. This embodiment also shows an endoscope apparatus using optical communication.

Figure 11:
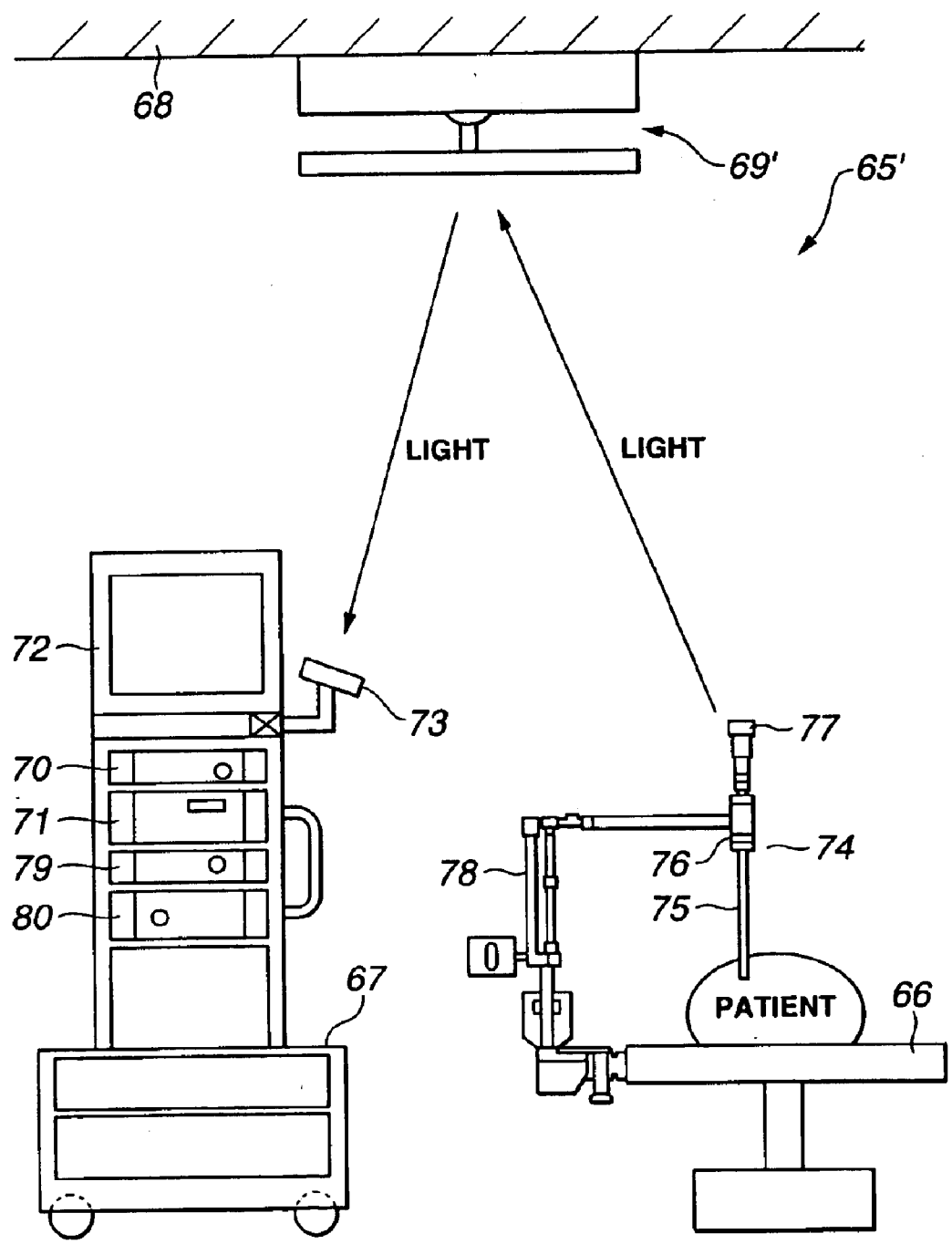

An endoscope apparatus 65' using optical communication shown in FIG. 11 has an arrangement in which, in the endoscope apparatus 65 in FIG. 8, a movable reflection unit (movable repeating unit) 69' is arranged on a ceiling 68.

In an endoscope 74, an optical communication transmission device 77 described above, a light source, an image pickup device, a battery (which are not shown), and a position notification means which notifies the movable reflection unit 69' of a position are arranged at the rear end of a main body 76 thereof.

Figure 12:
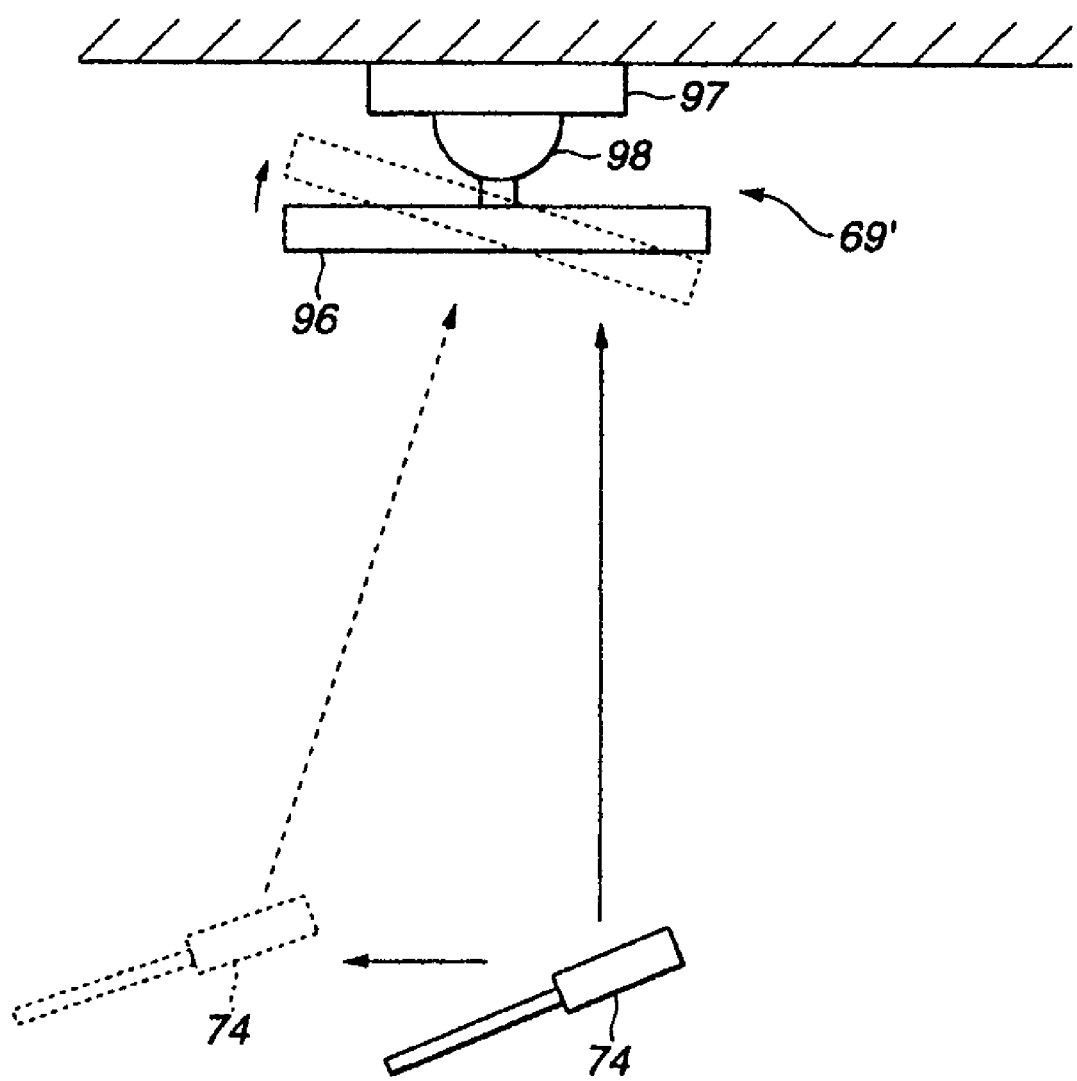

FIG. 12 shows the constitution of the movable reflection unit 69'.

In the movable reflection unit 69', a reflection plate 96, a position detection device 97, and a reflection plate drive device 98 are provided. The position detection device 97 receives a signal from the position notification means provided to in the endoscope 74 to command the reflection plate drive device 98 to drive the reflection plate 96 so as to always oppose the endoscope 74.

The remaining constitution configuration in FIG. 12 is the same as that shown in FIG. 8.

The function of this embodiment will be described below. The embodiment has the following function, in addition to the function in FIG. 8.

That is to say, an operator or the like maybe an obstruction in optical communication in the apparatus in FIG. 8. On such occasion, the influence due to the obstruction is avoided by the communication paths obtained by the repeating unit 69. However, when the endoscope 74 to which the optical communication transmission device 77 is provided is moved, the communication paths obtained by the repeating unit 69 as well as the state of the reflection surface of the repeating unit 69 may become improper.

This embodiment can cope with such occasion. For example, when the endoscope 74 moves from a position indicated by a solid line to a position indicated by a dotted line in the direction indicated by an arrow, the reflection plate 96 is designed such that it also can be moved to the position indicated by the dotted line. In this manner, the state of the movable reflection unit 69, is movably adjusted such that the state of the reflection surface thereof is appropriate.

Thus, according to this embodiment, if the endoscope 74 is moved to move the position, and the state of the movable reflection unit 69' before the endoscope 74 is moved is changed such that the state of the communication path is not appropriate, the posture of the reflection plate 96 is changed as indicated by the dotted line by a position signal from the optical communication transmission device 77, so that the state of the movable reflection unit 69' is set such that the state of the communication path is appropriate.

Therefore, according to this embodiment, even if the endoscope is moved, the apparatus can be maintained such that optical communication can be always performed.

In case the astral lamp is constituted by a large number of lamps, it is also possible that reflection units or repeating units are arranged for the respective lamps. In this manner, if one reflection unit may be arranged to cut the optical communication, optical communication may be able to be performed by the remaining components without any trouble.

Figure 13:
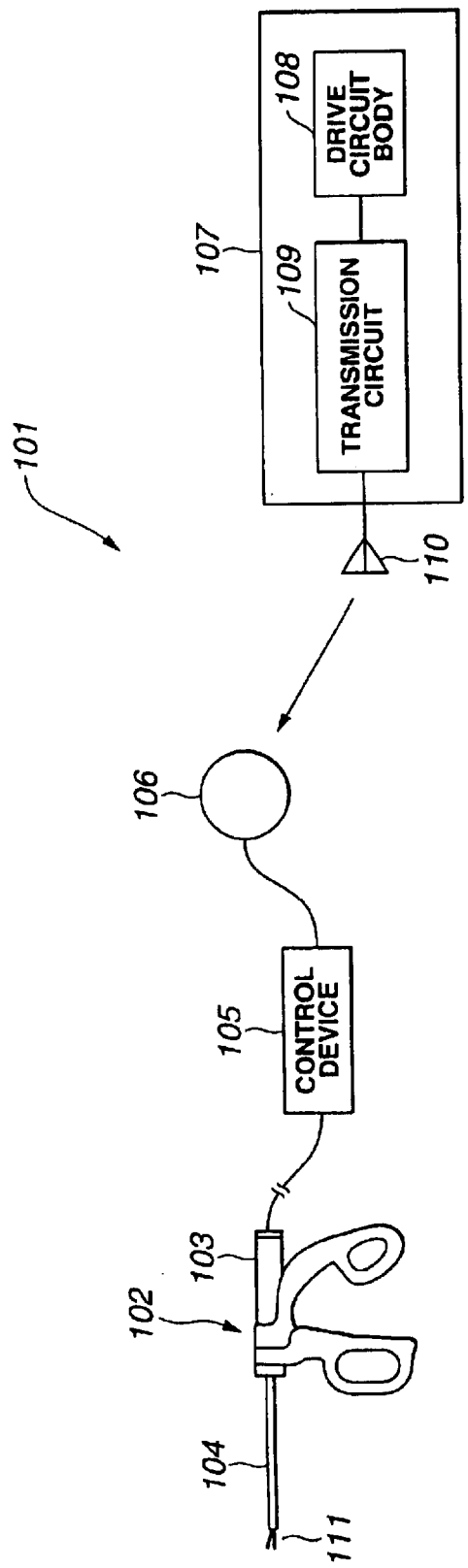
FIG. 13 is a diagram showing the configuration of an ultrasonic coagulation cutting system.

An ultrasonic coagulation cutting system 101 shown in FIG. 13 has an ultrasonic coagulation cutting device 102, and the ultrasonic coagulation cutting device 102 is composed of a main body 103 and an insertion unit 104.

The main body 103 is connected to a control device 105. To the main body 103, a reception circuit 106 for receiving drive energy through the control device 105 is connected.

On the other hand, an energy transmitter 107 for transmitting drive energy comprises by a drive circuit body 108 and a transmission circuit 109.

The drive energy generated by the drive circuit body 108 is converted to transmission energy by the transmission circuit 109, and the transmission energy from a transmission antenna 110 is received by the reception circuit 106 of the ultrasonic coagulation cutting device 102. The transmission energy is converted to drive energy again, and the drive energy is transmitted to an operating unit 111 arranged at the distal end of the insertion unit 104, so that a part affected (not shown) can be coagulated and cut with ultrasonic energy.

At this time, the strength of the ultrasonic energy can be controlled by the control device 105 connected to the main body 103.

In the ultrasonic coagulation cutting system 101, the transmission antenna 110 and a reception antenna (not shown) arranged in the reception circuit 106 are constituted by a plurality of antennas, and are designed such that transmission and reception can be performed at different frequencies respectively.

Signals generated from the respective transmission antennas 110 are received by the respective reception antennas which are suitable for reception of the signals of the frequencies, and the received signals are gathered, so that drive energy of a large power can be obtained as a whole.

[Sixth Embodiment]

The sixth embodiment of the present invention will be described below with reference to FIGS. 14 to 19. Only different parts between the first embodiment and the sixth embodiment will be described below.

Figure 14:
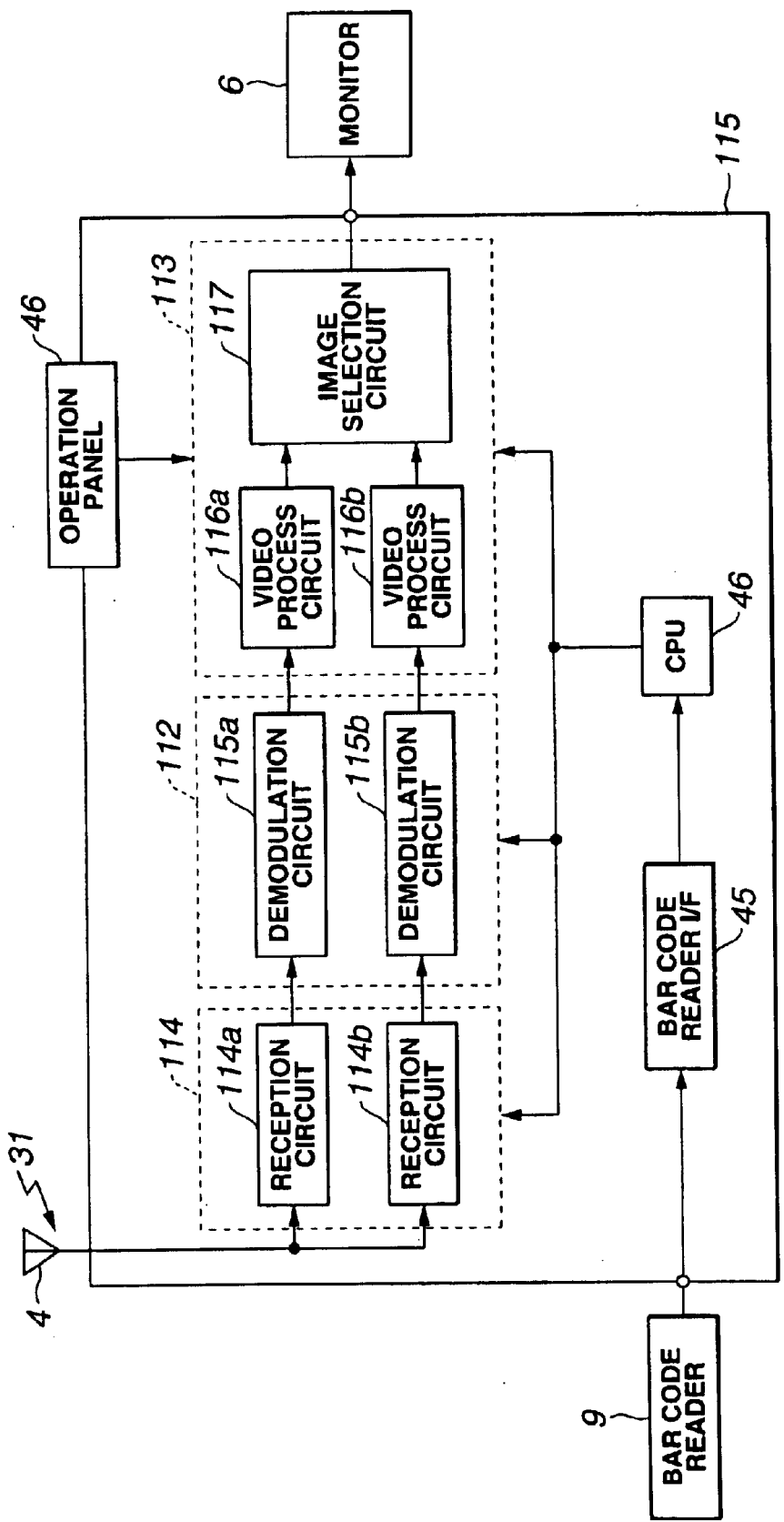

FIG. 14 shows the internal constitution of a receiver 115 in the sixth embodiment. In the receiver 115, when a radio wave 31 is incident on an antenna 4, a signal excited at the antenna 4 is selectively amplified by a reception unit 114, converted to a video signal by a demodulation unit 112, and converted to video signal through a video process unit 113. An endoscope image picked up by an image pickup element 22 (see FIG. 2) is displayed on a monitor 6.

The reception unit 114, the demodulation unit 112, and the video process unit 113 have two lines of reception circuits 114a and 114b, two lines of demodulation circuits 115a and 115b, and two lines of video process circuits 116a and 116b, respectively. Outputs from the video process circuits 116a and 116b are output to the monitor 6 through an image selection circuit 117. The reception unit 114, the demodulation unit 112, and the video process unit 113 are controlled by a CPU 46.

Figure 15:
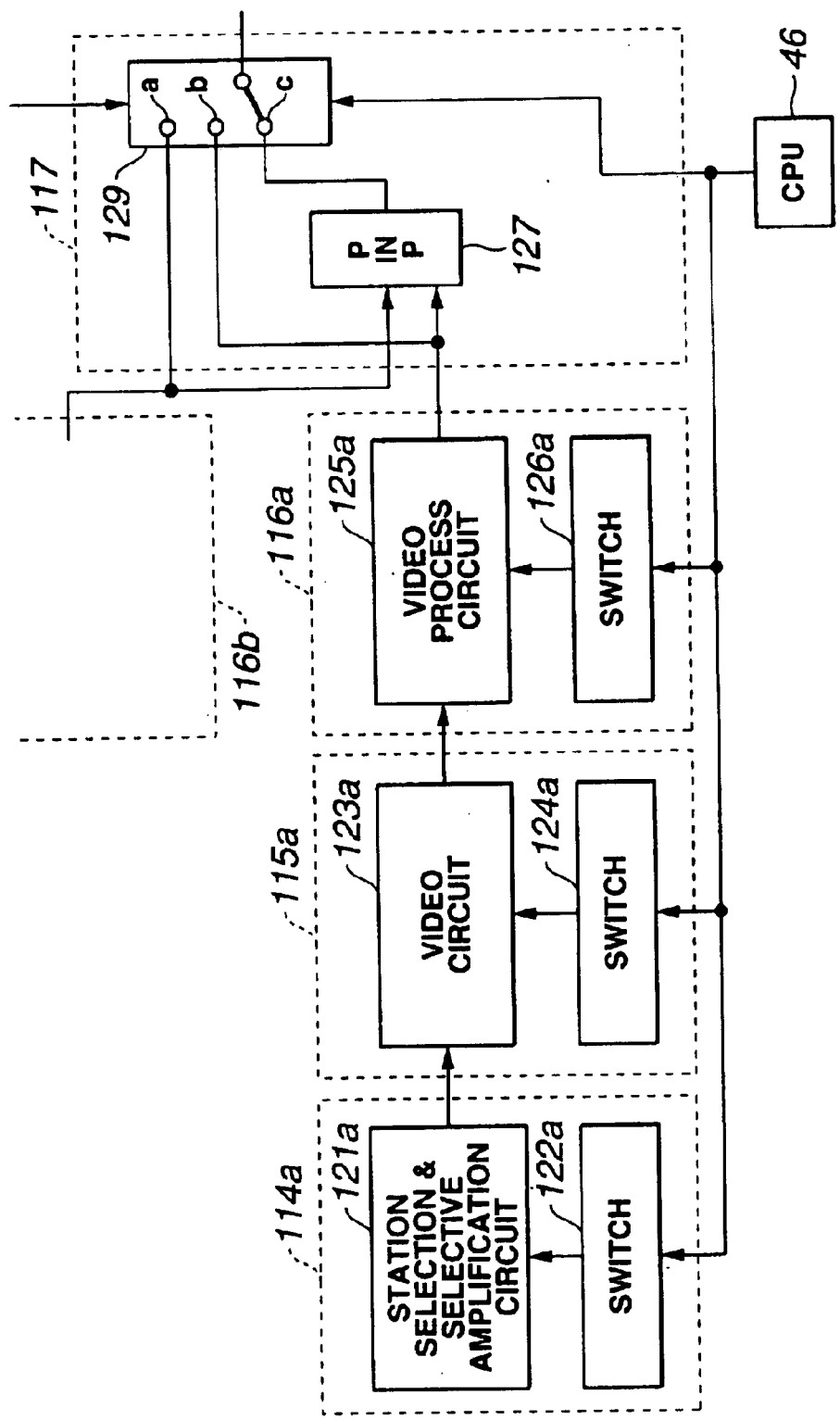

As shown in FIG. 15, the reception circuit 114a comprises by a selective amplification circuit 121a for perform station selection and selective amplification and a switch 122a for selecting a station selection frequency by the station selection unit. The reception circuit 114b has the same constitution as that of the reception circuit 114a.

The demodulation circuit 115a to which an output signal from the selective amplification circuit 121a is input comprises a video circuit (television signal generation circuit) 123a for performing video signal detection or the like to generate a color television signal, and a switch 124a for selecting a characteristic thereof. The demodulation circuit 115b has the same constitution as that of the demodulation circuit 115a.

The video process circuit 116a to which an output signal from the demodulation circuit 115a is input comprises a video processing circuit 125a for performing a video process such as color signal reproduction and a switch 126a for switching the characteristics of color reproduction or the like of the video processing circuit 125a. The video process circuit 116b has the same constitution as that of the video process circuit 116a.

Output signals from the video process circuits 116a and 116b are input to the image selection circuit 117 and a picture in picture circuit (to be simply referred to as P in P) 127 for displaying two images in a picture-in-picture manner.

Output signals from the video process circuits 116a and 116b are input to a selection switch 129 together with output signals from the P in P 127. When a contact point a or b is selected, one image is output to the monitor 6. However, when a contact point c is selected, a picture-in-picture image, for example, for simultaneously displaying two images adjacent to each other is displayed.

Figure 16:
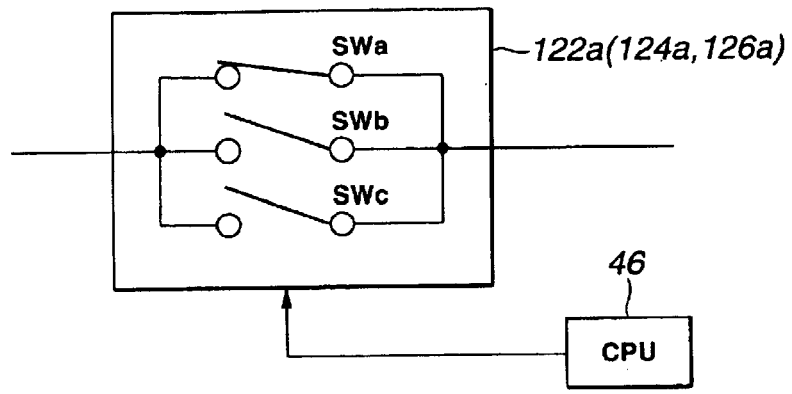

The switches 122a, 124a, 126a, and 129 can be controlled by the CPU 46. The constitution of switches 122a, 124a, and 126a is shown in FIG. 16. In FIG. 16, the switch 122a or the like is constituted by, e.g., three switches SWa to SWc. The ON and OFF states of the switches are controlled by the CPU 46.

The selection switch 129 is designed such that an arbitrary contact point can be selected by the operation from the operation panel 44.

The CPU 46 controls the ON and OFF states of the switch 122a or the like, thereby to perform an operation such as station selection corresponding to information read from a bar code reader 9. As will be described later, when images obtained by two endoscopes are used at the same time, the CPU 46 controls the selection switch 129 so as to select the contact point c. When only one endoscope is used, the contact point a is selected.

The remaining constitution is the same as that in the first embodiment.

As is apparent from the above constitution, in this embodiment, since the two lines of reception circuits 114a and 114b or the like having two transmission frequencies different from each other are arranged, not only one image can be displayed on the monitor 6 but also two images can be displayed on the monitor 6 at the same time.

The operation of this embodiment will be described below with reference to the flow chart in FIG. 17.

A case in which two endoscopes 2A and 2B are used will be described below. For example, video image transmission is performed by the endoscope 2A as shown in step S11. Then, the bar code 8a provided to the endoscope 2A is read by the bar code reader 9 as shown in step S12, and the information of the bar code is transmitted to the CPU 46 through a bar code reader I/F 45.

In the next step S13, identification of transmission frequencies is performed on the basis of the information of the bar code 8a. Instep S14, it is decided whether the transmission frequency identified by the CPU 46 is the same as a frequency already been used or not. In this case, since the first endoscope 2A is used, it is decided that the frequency is not the same as the frequency already used, and the flow shifts to step S15.

In step S15, the CPU 46 controls a station selection operation for the reception circuit 114a through the switch 122a, and performs the process of setting a frequency such that the transmission frequency described in the bar code 8a can be received.

Figure 18A:
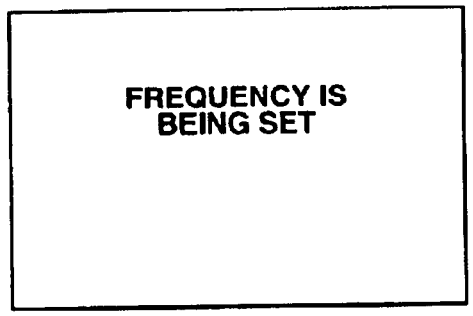
FIGS. 18A to 18F are diagrams showing message display contents or displayed images on a monitor respectively.

While the process of setting a frequency is performed, a display as shown in FIG. 18A representing that the frequency is being set is performed on the monitor 6.

An output signal from the reception circuit 114a is subjected to a video process for generating a color television signal from the demodulation circuit 115a (step S16), and is subjected to a color signal reproducing process by the video process circuit 116a and is output to the monitor 6. Thus, an image picked up by the endoscope 2A is displayed on the monitor 6 as shown in, e.g., FIG. 18D. In FIG. 18D, reference symbol A simply represents the image picked up by the endoscope 2A.

Thereafter, as indicated in step S18, the CPU 46 decides whether there is an additional bar code or not. When it is selected that the second endoscope 2B is not used, the flow returns to step S17, thereby to hold the previous display contents.

On the other hand, when it is selected that the second endoscope 2B is used, the flow returns to step S12, so as to read the bar code 8b of the second endoscope 2B with the bar code reader 9. Then, the CPU 46 receives the information, identifies transmission frequencies on the basis of the information (step S13), and decides whether a frequency is the same as the transmission frequency already used. If it is decided that the transmission frequencies are not the same, the flow shifts to step S15.

Figure 18B:
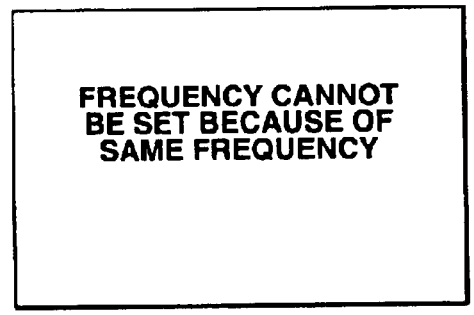

On the other hand, when a second endoscope having a bar code on which the information of the same frequency as the frequency already used is recorded is to be used, an error message as shown in FIG. 18B is displayed on the monitor 6 (step S19), and the flow returns to step S12.

Figure 18C:
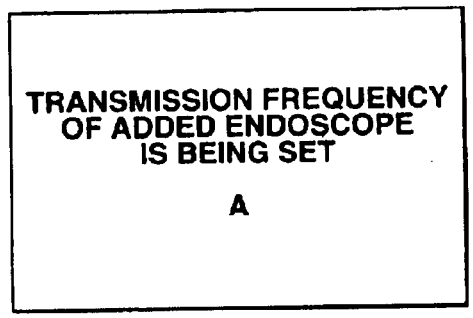
Figure 18D:
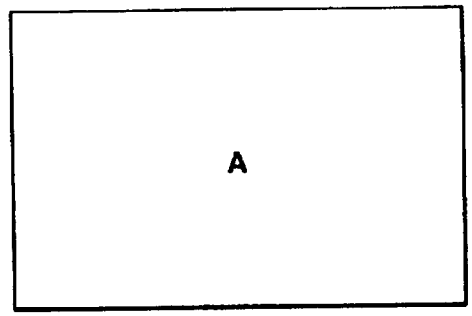

In step S15, the frequency of the other reception circuit 114b is set. In this case, an image A in which a message as shown in, e.g., FIG. 18C is displayed is displayed on the monitor 6.

Figure 18E:
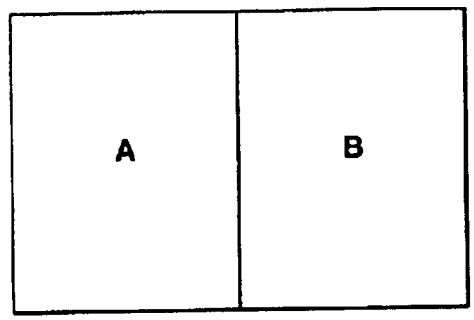

Thereafter, a video process or the like is performed in step S16, so that two images A and B are simultaneously displayed on the monitor 6 as shown in FIG. 18E. More specifically, in this case, the CPU 46 outputs the image passing through the P in P 127 onto the monitor 6, controls the selection switch 129 so as to display the two images A and B as shown in FIG. 18E, and turns on the contact point C.

Figure 18F:
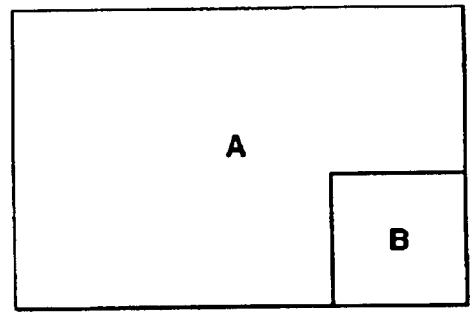

As needed, an operator can also display a P in P image as shown in FIG. 18F by operating the operation panel 44. In FIG. 18F, an image B is displayed in a small size in a part of an image A. In contrast to the displaying shown in FIG. 18F, it is also possible to select a screen such that the image A is displayed in a small size in a part of the image B (not shown).

As a modification of the constitution shown in FIG. 14, a system in which reception lines can be switched with a switch 200 as shown in FIG. 19 may be used.

More specifically, reception process lines 201 and 202 are connected respectively to a switch SWa and a switch SWb of the switch 200 connected to the antenna 4 or the like, and output signals from the reception process lines 201 and 202 are input to the image selection circuit 117. The reception process line 201 comprises the reception circuit 114a, the demodulation circuit 115a, and the video process circuit 116a. The reception process line 202 has the same constitution as that of the reception process line 201.

The CPU 46 controls the ON and OFF state of the switch SWa and the switch SWb of the switch circuit 200. The CPU 46 also controls the image selection circuit 117. A reception process line (not shown) may be additionally connected to the switch SWc of the switch circuit 200.

Although a case using an endoscope has been described in this embodiment, another apparatus such as a medical microscope which treats a video signal may be used. The video image transmission method has been described in an analog wireless system. However, the video image transmission method may be described in an SS wireless system or a wireless LAN system in which a video image is digitized.

This embodiment has the following advantages.

A plurality of endoscopes can be simultaneously used. Also, a plurality of images can be simultaneously displayed.

Even if, endoscopes having bar codes in which the same frequency has been written exist and are to be simultaneously used, interference can be prevented.

It is also possible that two monitors are prepared and respectively connected to the contact points a and b of the selection switch 129 so that two images are independently displayed.

[Seventh Embodiment]

The seventh embodiment of the present invention will be described below with reference to FIGS. 20 to 22.

In a receiver 135 in the seventh embodiment shown in FIG. 20, a reception wave identification circuit 131 for receiving an excited signal through the antenna 4 to identity (detect) a reception frequency is added in the receiver 115 shown in FIG. 14, so that information identified by the reception wave identification circuit 131 is output to the CPU 46.

The CPU 46, as will be described later, decides whether the information identified by the reception wave identification circuit 131 coincides with the information of a transmission frequency of a bar code read by a bar code reader 9 or not, and changes processes on the basis of the decision result. The other constitution of the seventh embodiment is the same as that of the sixth embodiment.

The operation of this embodiment will be described below with reference to FIG. 21. The steps S11 to S13 are the same as those described in FIG. 17. The transmission frequency of the bar code is identified in step S13.

By the reception wave identification circuit 131, a reception frequency is detected as shown in step S21, and the result thereof is transmitted to the CPU 46. As shown in step S22, the CPU 46 decides whether the transmission frequency identified by the bar code 8a in step S13 is the same as the reception frequency detected by the reception wave identification circuit 131 or not.

Figure 17:
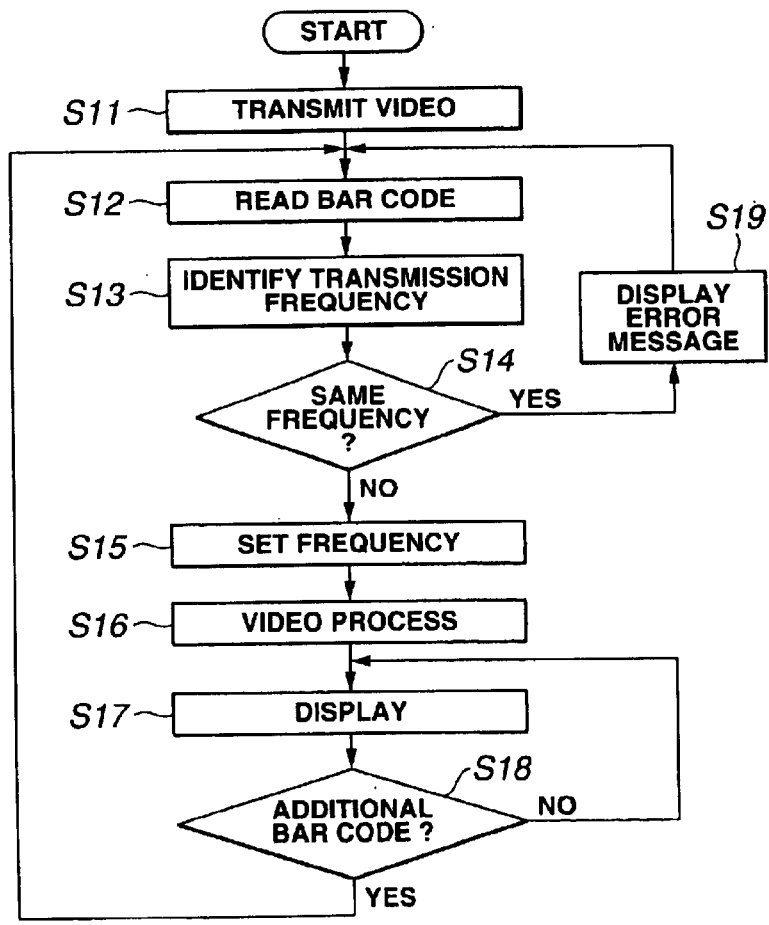

If it is decided that these frequencies are the same, the flow shifts to step S14 to perform the same process as that in FIG. 17.

On the other hand, if it is decided that these frequencies are not the same, the flow returns to step S12, to repeat, the same processes again.

This embodiment has the following advantages.

When a transmission frequency which is not supposed is received, an erroneous image can be advantageously prevented from being displayed on the monitor 6 without setting a frequency.

Figure 22:
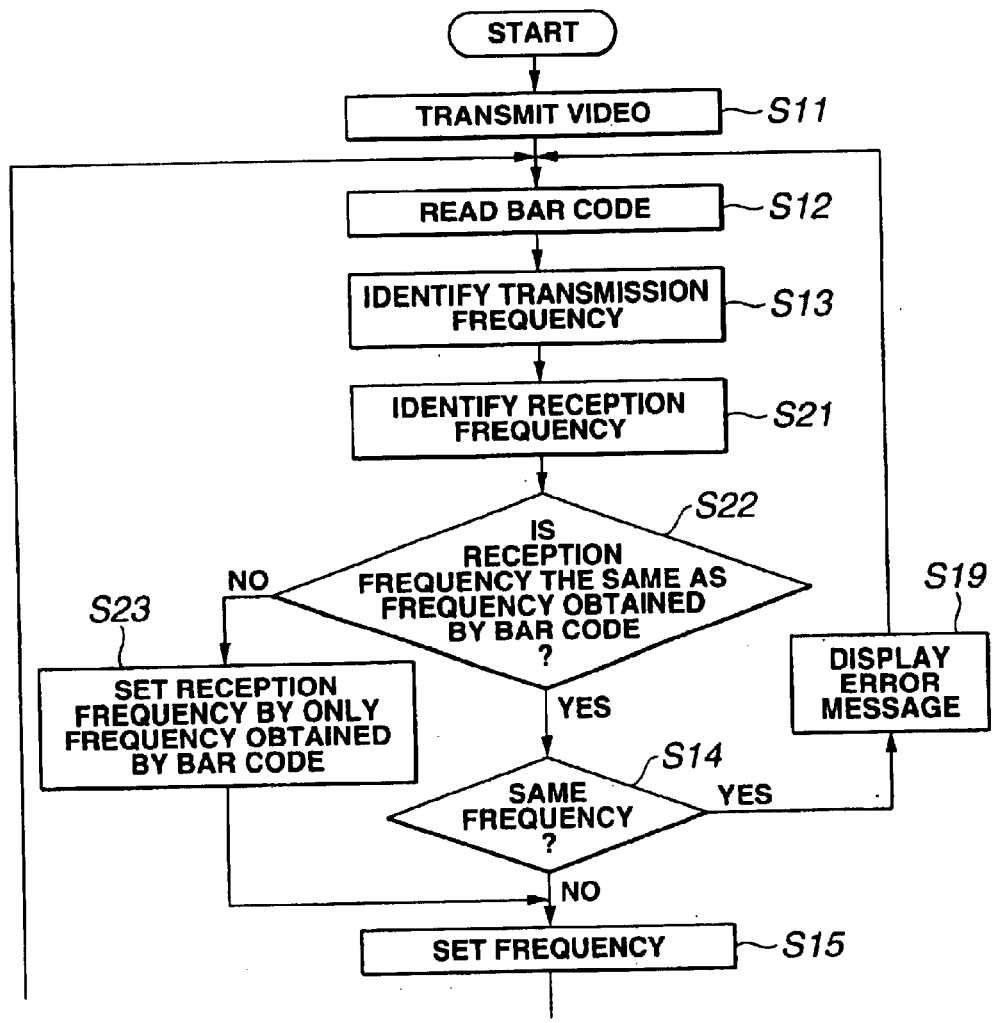

FIG. 22 shows the operation of a modification.

Figure 21:
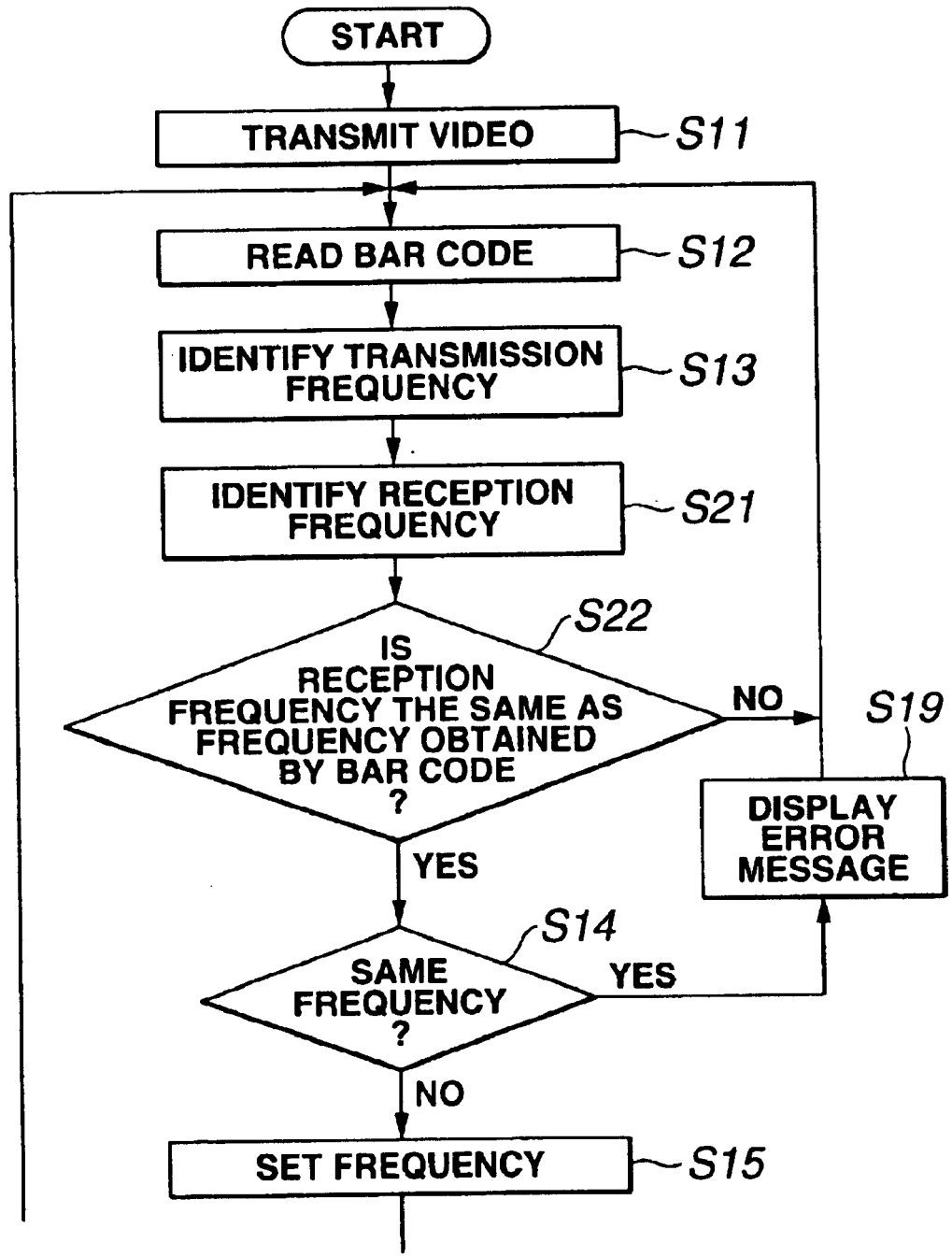

The flow chart shown in FIG. 22 is different from the flow chart shown in FIG. 21 in a process when, as a result of the decision in step S22 in FIG. 21, it is decided that the frequencies are not the same.

When it is decided that both the frequencies are not the same, the flow shifts to step S23, so that a reception frequency is set by using a transmission frequency identified by the bar code 8a (or 8b). Thereafter, the flow shifts to step S16, to perform the same processes as those in FIG. 21 or 17.

More specifically, in this modification, if the frequency detected by the reception wave identification circuit 131 is different from the frequency detected by the bar code 8a or the like, receiving operation is performed at the frequency detected by the bar code 8a or the like, and an image is displayed.

According to this modification, even if a radio wave which has a frequency different from the frequency transmitted by the endoscope and which is obtained by another device or the like is received, an image obtained by the endoscope can be displayed without being adversely affected thereby.

[Eighth Embodiment]

Figure 24:
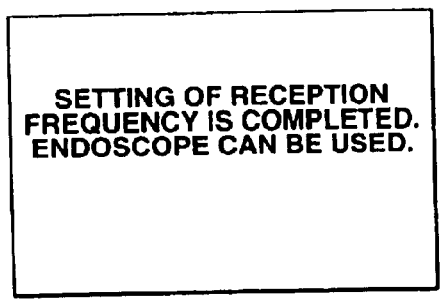
Figure 23:
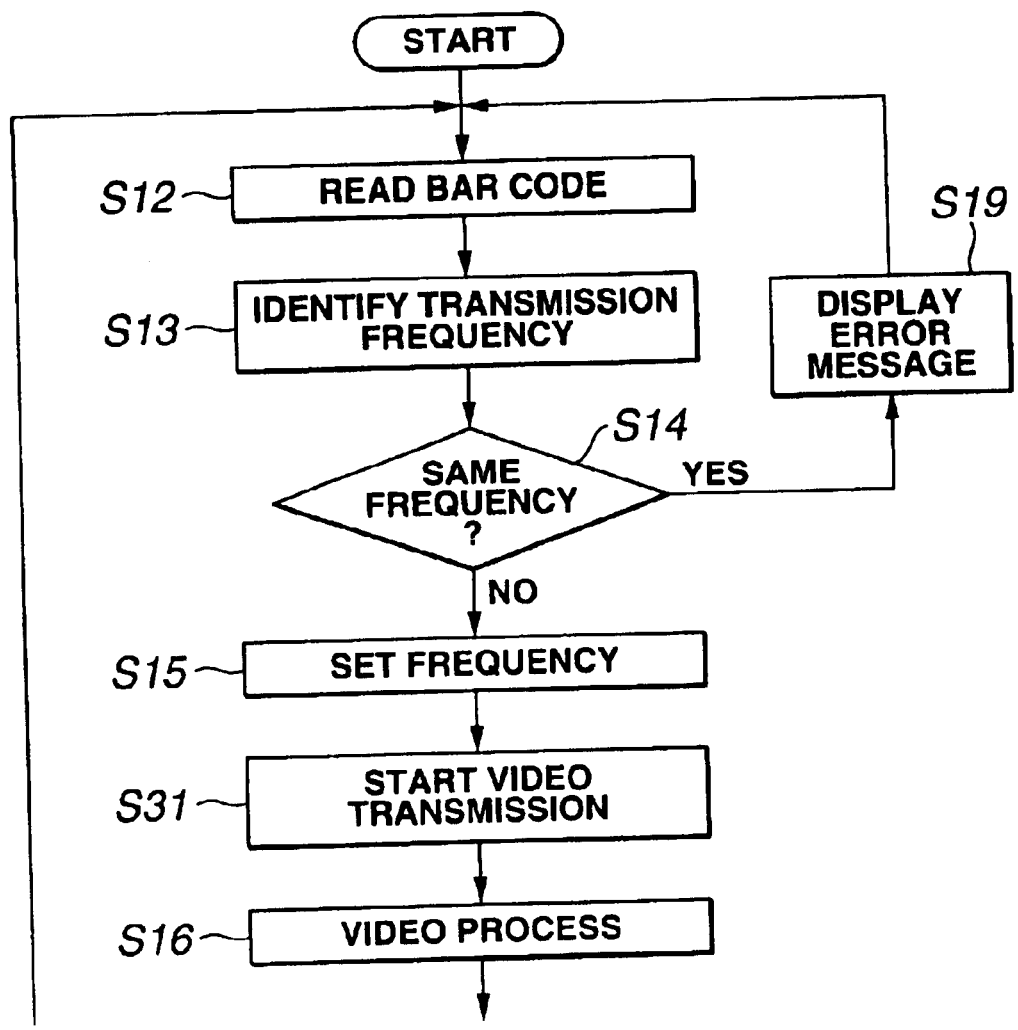

The eighth embodiment of the present invention will be described below with reference to FIGS. 23 and 24.

This embodiment has the same constitution as that of the sixth embodiment except for some operations. More specifically, in the sixth embodiment, after a video image is transmitted by the endoscope, a frequency is set on the receiver side. However, in the eighth embodiment, a frequency is set first, and thereafter a video image is transmitted by the endoscope.

The operation performed in this case will be described below with reference to FIG. 23.

When the operation is started, while the process in step S11 in FIG. 17 is being omitted, the bar code reading process in step S12 is performed. The process of identifying a transmission frequency in step S13 and the process of deciding whether the frequencies are the same in step S14 are performed.

If the frequencies are not the same, the flow shifts to step S15, so that a frequency is set. Then, a message representing that the setting of the frequency is completed is displayed on the monitor 6 as shown in FIG. 24 to notify an operator that the endoscope can be used.

Thereafter, video transmission is started in step S31. More specifically, the power supply of the endoscope 2A or the like is turned on to start the transmission. Then, a signal of the transmission frequency is received on the receiver 135 side, so that a video process in step S16 is performed. Thereafter, the same processes as in FIG. 17 are performed.

This embodiment has the following advantages.

Since no endoscope image is displayed on the monitor 6 until a frequency is set, an unexpected image can be advantageously prevented from being displayed, and a display of the image can be advantageously prevented from being disturbed by a noisy radio wave or the like.

[Ninth Embodiment]

The ninth embodiment of the present invention will be described below with reference to FIGS. 25 and 26.

A receiver 141 in this embodiment comprises, in addition to the components, for example, in the seventh embodiment shown in FIG. 20, high-frequency amplification units 142a and 142b.

More specifically, a signal excited at an antenna 4 is input to a reception wave identification circuit 131, so that the reception frequency of the signal is identified, and the information of the reception frequency is transmitted to the CPU 46.

The signal excited at the antenna 4 is also input to the high-frequency amplification circuit 144a through a switch 143a in the high-frequency amplification unit 142a or through this high-frequency amplification circuit 144a and also through a switch 145a to the reception circuit 114a. The high-frequency amplification unit 142b has the same constitution as that of the high-frequency amplification unit 142a.

The switches 145a and 145b are switched in conjunction with each other by the CPU 46. The high-frequency amplification circuit 144a has a variable resonance circuit 146a, e.g., on the input side thereof. In the variable resonance circuit 146a, a variable capacity diode 147a (the capacity of which is changed by an applied voltage) is arranged, e.g., in parallel to a coil. This variable capacity diode 147a is applied with a control voltage by the CPU 46, so that the resonance frequency thereof may be variably set.

In this embodiment, if an information of a reception frequency different from the frequency read by the bar code reader 9 is input to the CPU 46 by the reception wave identification circuit 131, the CPU 46 set a frequency of the station selection unit of the reception circuit 114a to a frequency read by the bar code reader 9, and the switches 143a and 145a are switched such that the contact point a is turned on. In addition, the CPU 46 applies a control voltage to the variable capacity diode 147a, so that the capacity of the variable capacity diode 147a is variably set by the control voltage, and the resonance frequency of the variable resonance circuit 146a is set to the frequency read by the bar code reader 9.

The function in this case will be described below with reference to FIG. 26.

Figure 26:
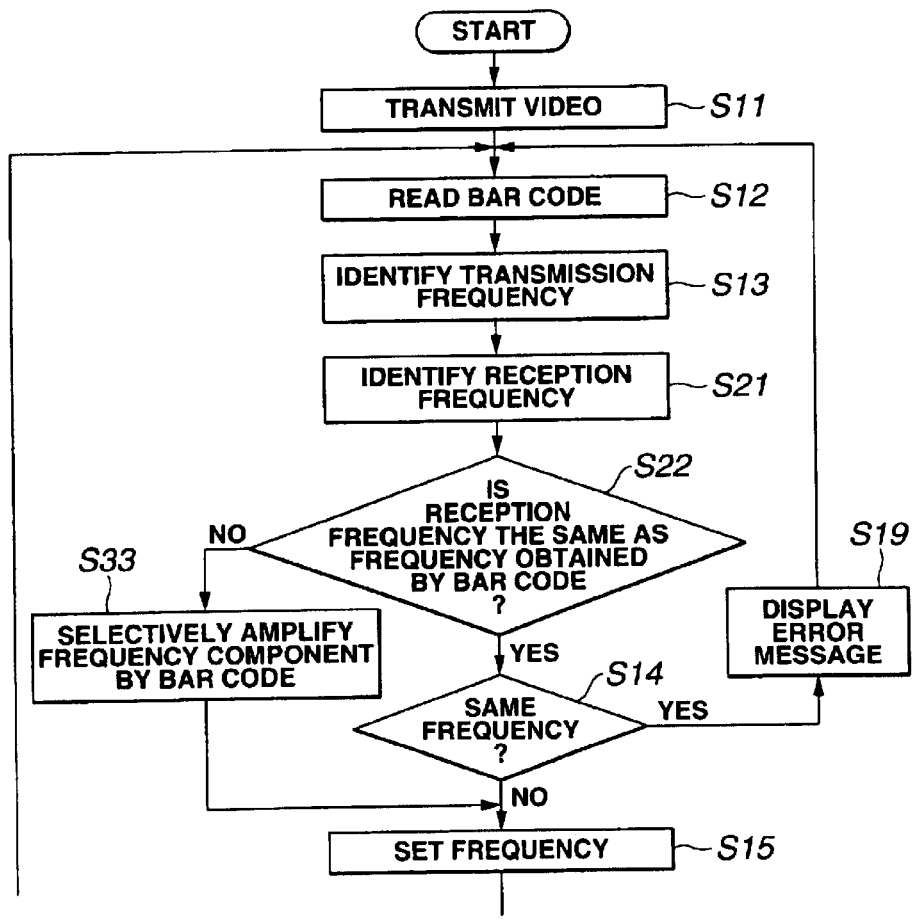

Steps S11 to S22 in FIG. 26 are the same as those in FIG. 21. It is decided in step S22 whether a reception frequency is the same as a frequency obtained by a bar code or not. If these frequencies are the same, the flow shifts to step S14.

On the other hand, if these frequencies are not the same, the flow shifts to step S33, the high-frequency amplification unit 142a is set in such a state that the frequency component obtained by the bar code is selectively amplified, and the frequency of the reception circuit 114a is set to the frequency in step S15. The remaining processes are the same as those in FIG. 21.

In this manner, when the radio wave is to be received by using the endoscope 2A or the like, if a radio wave from another electric device is received by the endoscope 2A, only the frequency component of the transmission frequency obtained by the endoscope 2A is selectively amplified. In this manner, the signal obtained by the endoscope 2A can be received at a high S/N ratio.

This embodiment has the following advantages.

Even if any device to use a radio wave which is not supposed exists in using the endoscope, the endoscope can be used without being adversely affected by such device.

Figure 25:
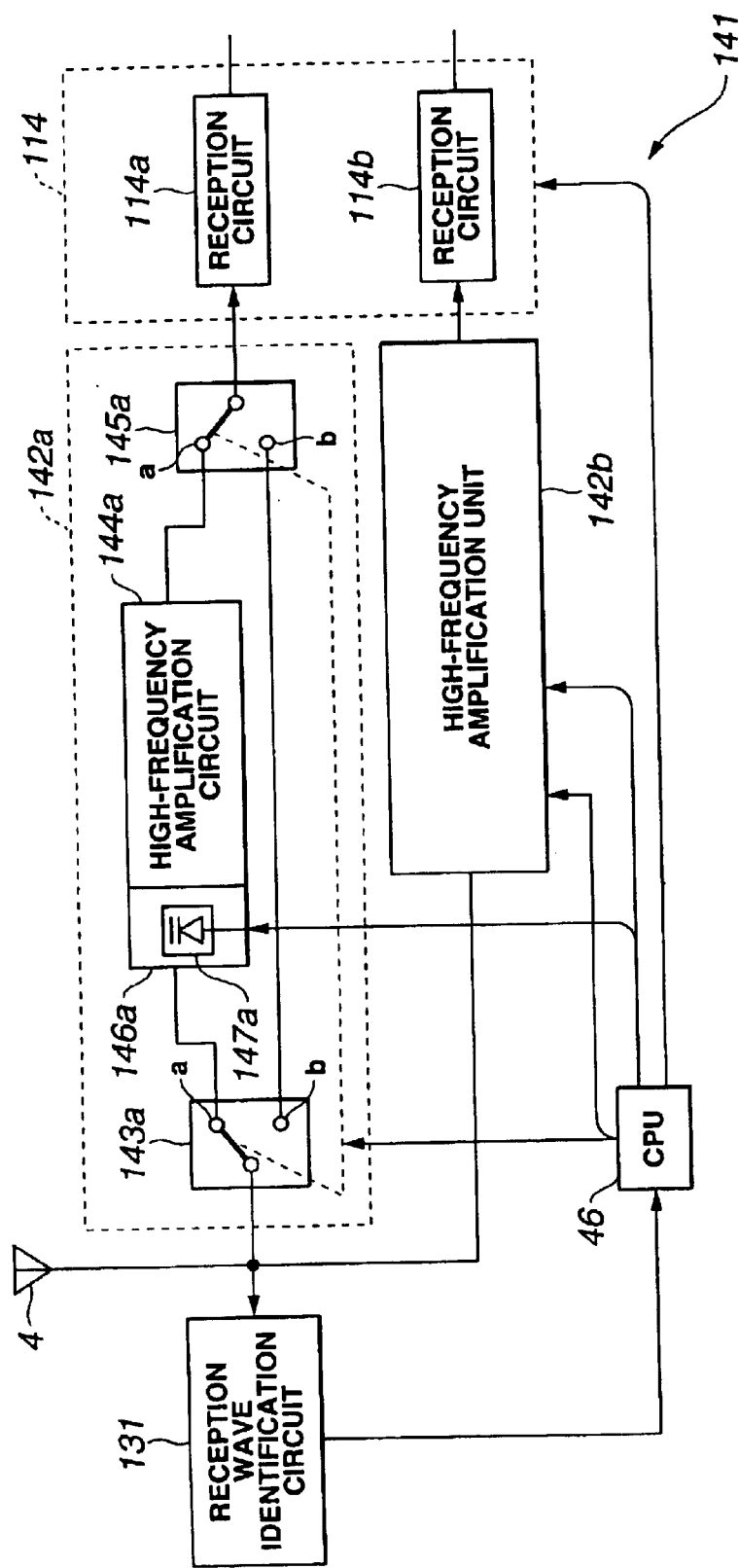

Although an original frequency (frequency of a bar code) component is selectively amplified in this embodiment, the process of a band-pass filter for causing the original frequency component to pass may be performed (in FIG. 25, when the amplification factor of the high-frequency amplification circuit 144a is set to be 1, the process of the band-pass filter is obtained).

[Tenth Embodiment]

The tenth embodiment of the present invention will be described below with reference to FIGS. 27 to 29.

An endoscope apparatus 151 shown in FIG. 27 comprises endoscopes 152A and 152B respectively having antennas 3a and 3b, a receiver 155 having an antenna 154, a monitor 156 for displaying an endoscope image, and a bar code reader 159.

The appearance of the endoscope 152A is the same as that of the endoscope 2A in FIG. 1. On the other hand, the endoscope 152B is composed of an optical endoscope 148 for obtaining, e.g., an optical image and a television camera 150 disposed on an eyepiece portion 149 of the optical endoscope 148 and having a built-in image pickup element 157.

A bar code 158a representing the information of a transmission frequency of the endoscope 152A is provided to the endoscope 152A, and a bar code 158b representing the information of a transmission frequency of the television camera 150 is provided to the television camera 150.

Figure 28:
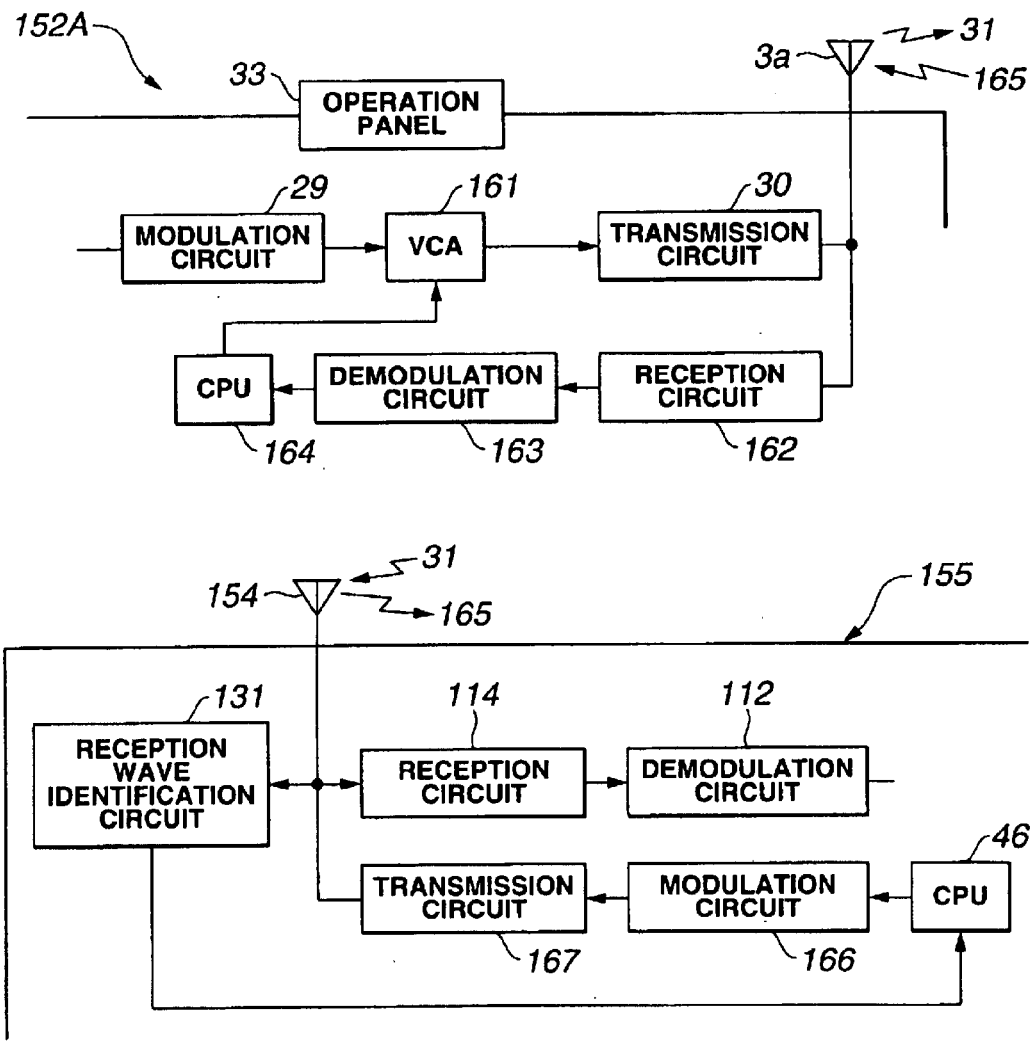
Figure 29:
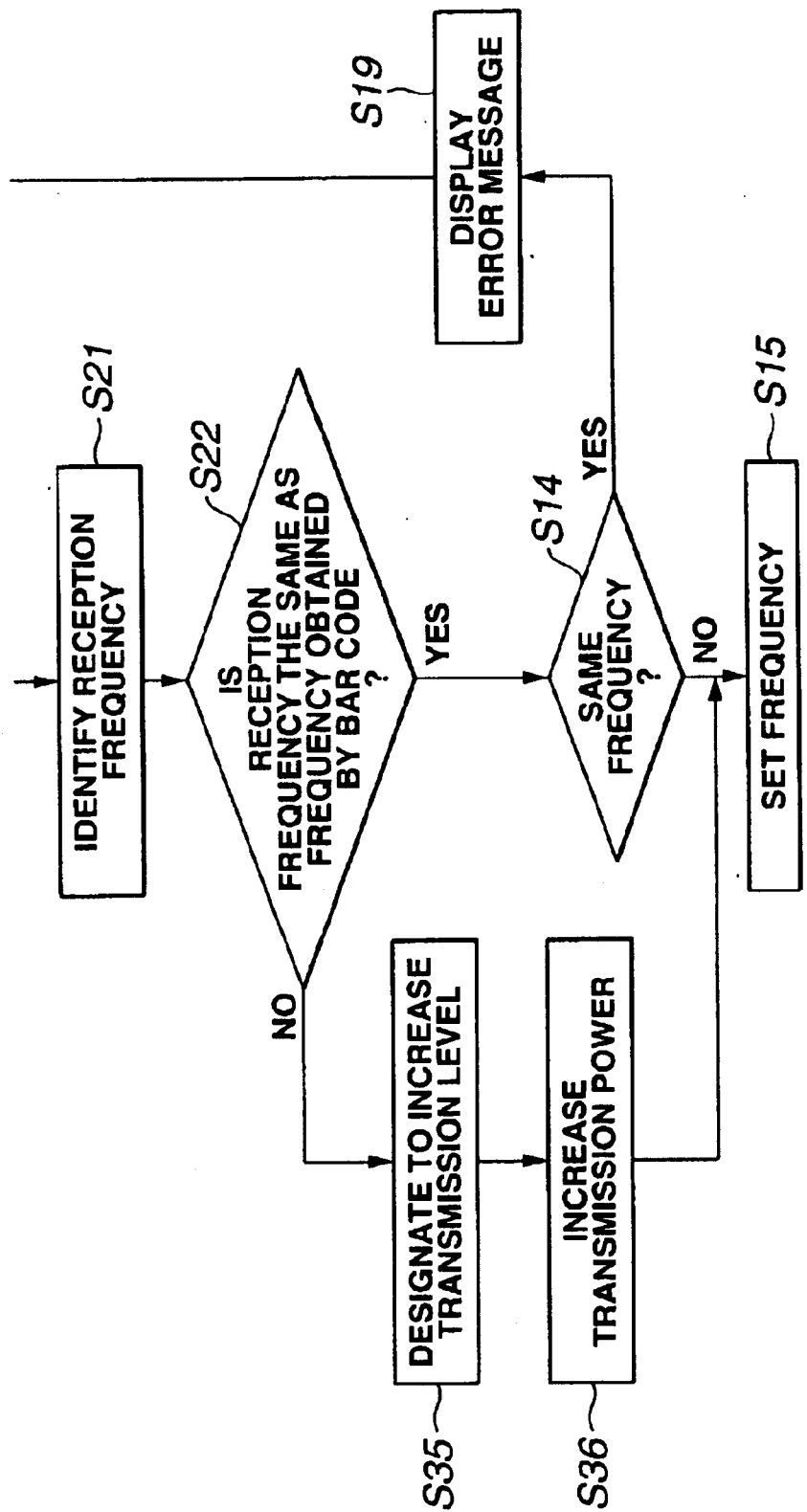

As shown in FIG. 28, the endoscope 152A has a constitution obtained by adding a receiving function or the like to the endoscope 2A in FIG. 2.

More specifically, in the constitution in FIG. 2, an output from a modulation circuit 29 is transmitted to a transmission circuit 30 through a variable amplification circuit 161. To an antenna 3a are connected a reception circuit 162, a demodulation circuit 163, and a CPU 164 to which an output from the demodulation circuit 163 is input. The CPU 164 controls the variable amplification circuit 161 by the output from the demodulation circuit 163 such that the amplification factor of the variable amplification circuit 161 increases.

In this embodiment, the endoscope 152A transmits an endoscope image with a radio wave 31, receives a radio wave 165 of a transmission signal from the receiver 155, and performs a process depending on the reception result.

The endoscope 152B (of the television camera 150) has the same constitution as that of the endoscope 152A.

On the other hand, the receiver 155 has a constitution obtained by adding a transmission function to the receiver 135 in FIG. 20.

More specifically, the receiver 155 has, in addition to the constitution in FIG. 20, a modulation circuit 166 and a transmission circuit 167. An identification result of a reception wave obtained by the reception wave identification circuit 131 is transmitted to the CPU 46. If the reception frequency thereof is not the same as a frequency obtained by a bar code, the CPU 46 adds the identification information of the endoscope to the endoscope 152A or 152B which has transmitted the endoscope image and transmits a transmission level increase designation signal to the modulation circuit 166.

This signal is modulated by the modulation circuit 166 and transmitted to the endoscope 152A or the like by the transmission circuit 167 and the antenna 4.

The endoscope 152A or the like receives the signal. On the basis of the identification information, the CPU 164 decides whether the endoscope is the one the transmission level of which is designated to be increased by an output from the demodulation circuit 163 or not. If the CPU 164 decides that the endoscope is the one the transmission level of which is designated to be increased, the CPU 164 increases the amplification factor of the variable amplification circuit 161. The other constitution is the same as that in FIG. 2 or 20.

The operation of this embodiment will be described below with reference to FIG. 29. Steps S11 to S22 in FIG. 29 are the same as those in FIG. 21. It is decided in step S22 whether a reception frequency is the same as a frequency obtained by a bar code. If the frequencies are the same, the flow shifts to step S14.

On the other hand, if the frequencies are not the same, the flow shifts to step S35, so that transmission level increase designation is performed from the CPU 46. For example, in a state in which a transmission signal from the endoscope 152A is received, if the CPU 46 decides that the reception frequency is not the same as the frequency of the bar code, the CPU 46 transmits the transmission level increase designation signal for increasing the level of the transmission signal through the modulation circuit 166 together with the identification information of the endoscope 152A.

Then, the process to increase the level of the transmission signal is performed in step 36.

In the endoscope 152A, the original identification information and the increase designation signal are received from the antenna 3a and demodulated through the reception circuit 162 and the demodulation circuit 163, to be input to the CPU 164. It is decided on the basis of the identification information that the endoscope is the one the transmission level of which is designated to be increased, and the corresponding process is performed by the CPU 164. More specifically, a video signal modulated by the VCA 161 is amplified, so that the transmission level is increased by the transmission circuit 30 and the antenna 3a.

Thus, the transmission level obtained by the corresponding endoscope is increased, thereby to ensure the reception while reducing influence of other electric devices.

Even if the endoscope 152B the transmission level of which is not designated to be increased receives a signal from the receiver 155, it is decided, on the basis of the identification information, that the endoscope is the one the transmission level of which is not designated to be increased, so that the transmission level is not increased.

In this manner, when a signal having a frequency which is different from the transmission frequency by the endoscope 152A or 152B which is read by a bar code is received, a transmission power of the endoscope the transmission frequency of which is read by the bar code can be increased, so that a radio wave obtained by the endoscope can be received at a higher S/N ratio.

This embodiment has the following advantage.

Even if a device to use a radio wave which is not supposed exists in using the endoscope, the endoscope can be used while reducing influence by such device.

[Eleventh Embodiment]

The eleventh embodiment of the present invention will be described below with reference to FIGS. 30 and 31.

In the first embodiment to the tenth embodiment, the endoscopes each having a built-in image pickup element have been mainly described. However, the eleventh embodiment is the one in which a microscope for operation is used in place of an endoscope. Only different parts between the eleventh embodiment and the first embodiment will be described below.

Figure 30:
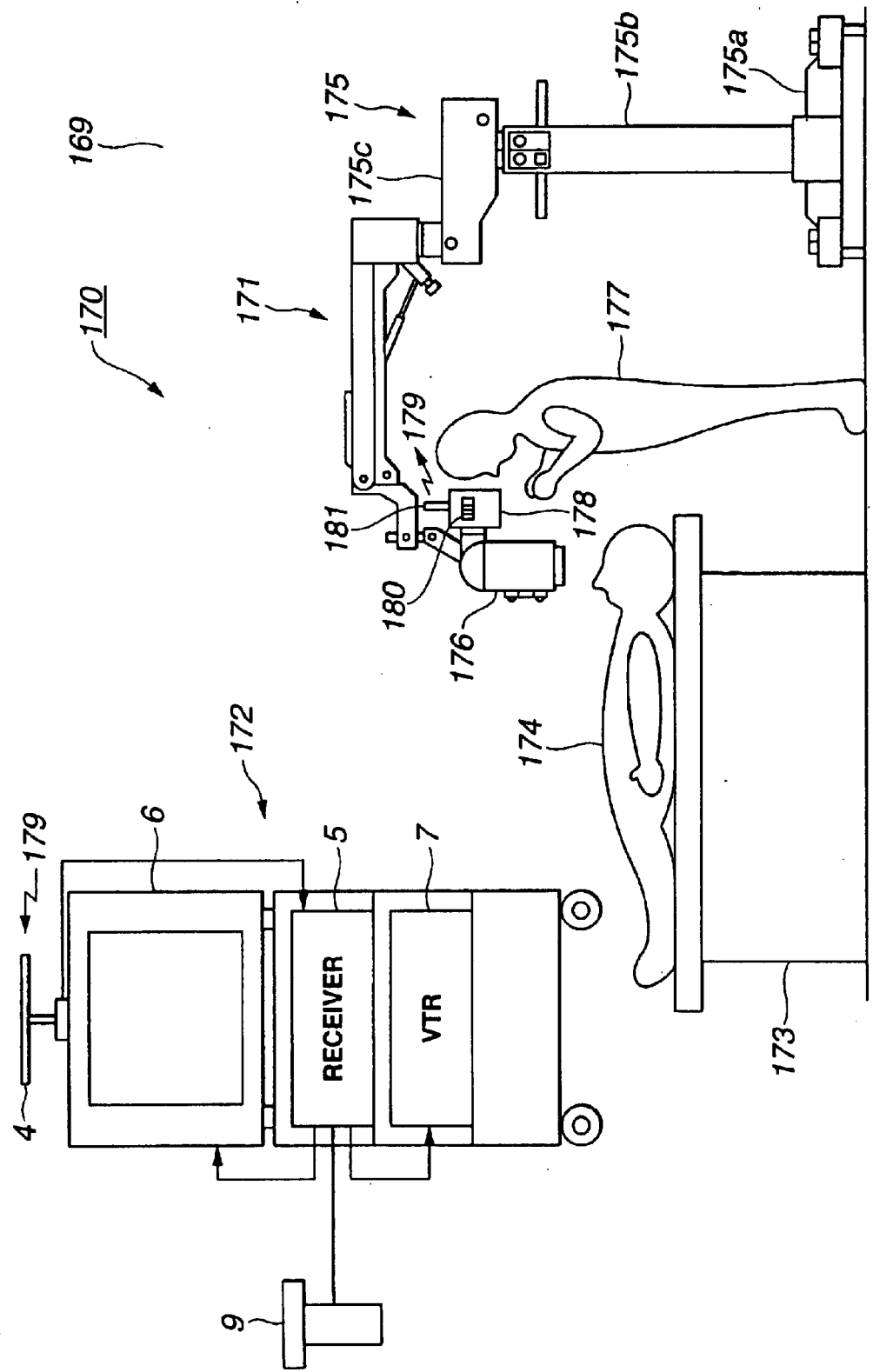

As shown in FIG. 30, a microscope apparatus for operation 170 provided in an operating room 169 is composed of a microscope for operation 171 and a reception device 172 having a receiver 5 or the like.

A main body of a microscope for operation (or a microscope body, to be simply referred to as a main body hereinafter) 176 is mounted to a frame 175 arranged near a patient 174 who lies on a bed 173.

The frame 175 constituting the microscope 171 for operation comprises a base 175a which can be moved on a floor surface and a support 175b erected on the base 175a. The frame 175 is arranged on the distal end side (for example, the side on which a part operated such as a head 174a of the patient 174 on the bed 173) of the bed 173 in the operating room 169.

In addition, an arm portion 175c which movably supports the main body 176 in an arbitrary direction is provided on the upper portion of the support 175b. A plurality of movable arms are provided on the arm portion 175c. In this case, the movable arms are connected to each other such that they are rotated about rotational shafts.

Electromagnetic brakes (not shown) are disposed respectively on the bearing portions of the rotational shafts of the arm portion 175c. Each of the electromagnetic brakes is designed to be ON/OFF-controlled by a switch (not shown) provided at a grip integrally fixed to the main body 176.

When the electromagnetic brakes are OFF-controlled, the arm portion 175c is held in a lock releasing state. Thus, the main body 176 can be three-dimensionally moved and spatially freely positioned, so that an operator 177 can observe the part operated at a desired angle. In addition, when the electromagnetic brakes are ON-controlled, the arm portion 175c is switched to be in a lock state, and the position of the main body 176 is fixed. In the microscope for operation 171, a light source (not shown) thereof for illuminating the portion operated of the patient 174 is built.

A wireless transmitter 178 for performing wireless transmission of an image captured by the microscope 171 is mounted on the main body 176, so that an image obtained by the main body 176 is transmitted to the reception device 172 side with a radio wave 179.

A bar code 180 is attached onto the wireless transmitter 178, and the transmission frequency of the wireless transmitter 178 can be read by a bar code reader 9.

An antenna 181 for performing transmission is provided to the wireless transmitter 178. The transmitted radio wave 179 generated from the antenna 181 is received by an antenna 4 connected to the receiver 5.

Figure 31:
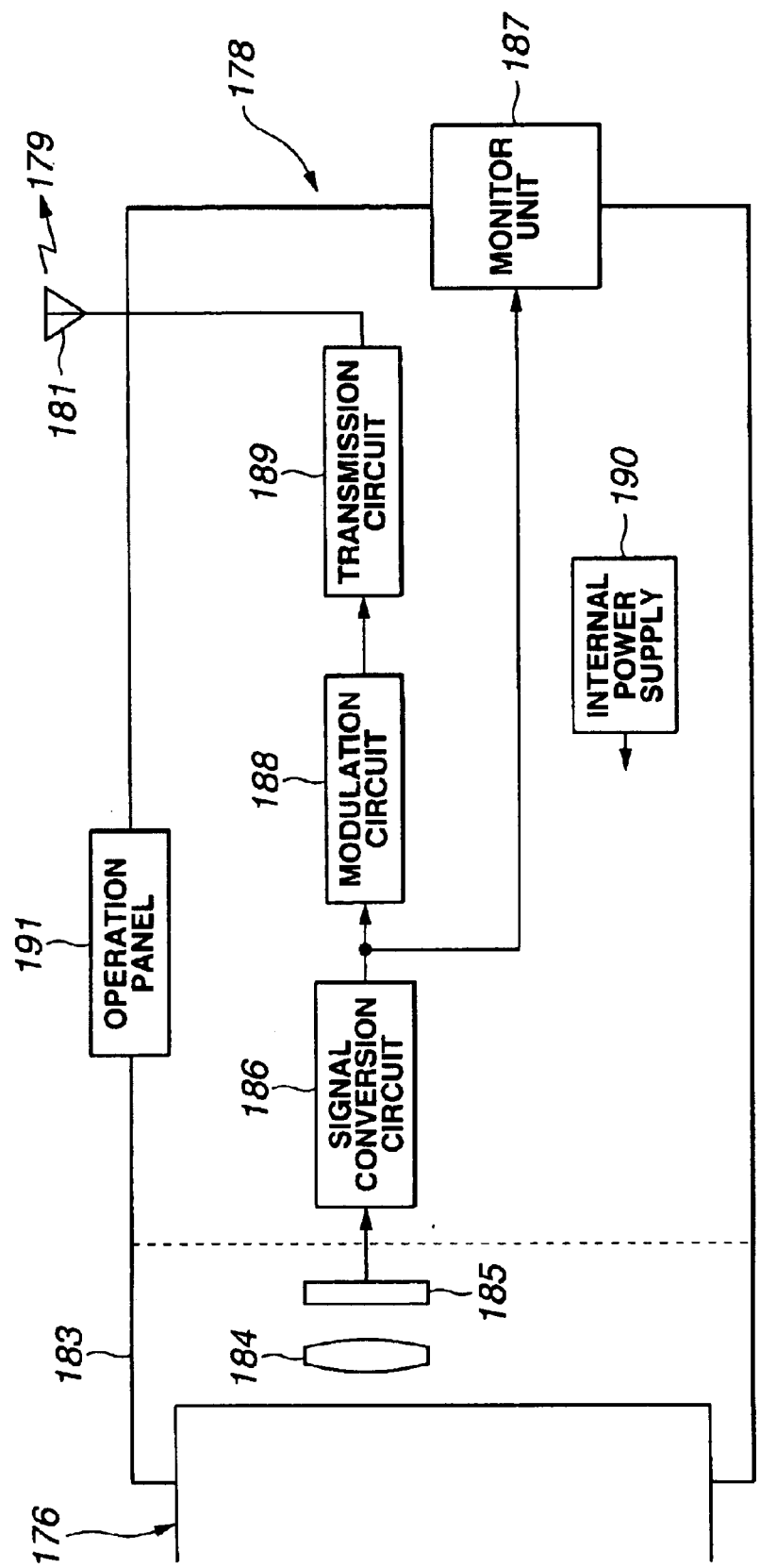

As shown in FIG. 31, a lens 184 is disposed at a connection potion 183 between the wireless transmitter 178 and the main body 176, and an image pickup element 185 for picking up a microscope image captured by the main body 176 is arranged at the image forming position. An image signal captured by the image pickup element 185 is subjected to a video process in a signal conversion circuit 186, and a generated video signal can be observed at a monitor unit 187.

On the other hand, the video signal subjected to the video process is subjected to a modulation process in the modulation circuit 188 so as to be transmitted, and thus, the radio wave 179 is transmitted by a transmission circuit 189 and the antenna 181. A power required for the operation is supplied from an internal power supply 190 to the image pickup element 185 or the signal conversion circuit 186. By control performed through an operation panel 191, a process performed by the signal conversion circuit 186 or the like can be variably set.

The transmission frequency of the bar code 180 attached onto the wireless transmitter 178 is read with the bar code reader 9. The other constitution of the eleventh embodiment is the same as that of the first embodiment.

In this embodiment, a microscope image obtained by the microscope 171 is transmitted by wireless in place of the endoscope image obtained by the endoscope in the first embodiment, and is displayed on a monitor 6 of the reception device 172. The other functions of the eleventh embodiment are the same as those in the first embodiment.

This embodiment has advantages which are almost the same as those of the first embodiment.

Other embodiments which may be constituted by partially combining the embodiments described above also belong to the present invention.

What is claimed is:

1. An image pickup apparatus mounted to a medical observation device having an optical system for observing a living body comprising:
   a television camera having an image pickup element built therein for picking up an image of a portion to be observed by the medical observation device;
   a wireless transmitter associated with the television camera for transmitting an image information signal of the image by wireless;
   an information display portion provided in the medical observation device to display frequency information of a transmission frequency of the wireless transmitter;
   an information reading device for reading the frequency information of the information display portion;
   a wireless receiver for receiving the image information signal transmitted from the wireless transmitter;
   a reception frequency setting unit for tuning a reception frequency of the wireless receiver to the transmission frequency of the image information signal transmitted from the wireless transmitter by using the frequency information read by the information reading device; and
   a video processing circuit for processing the image information signal received by the wireless receiver to provide an output signal for display.

2. An image pickup apparatus according to claim 1, wherein the medical observation device is an optical endoscope; and
   the television camera is mounted to the medical observation device.

3. An image pickup apparatus according to claim 1, wherein the medical observation device is a microscope for operation; and
   the television camera is mounted to the medical observation device.

4. An endoscope apparatus comprising:
   an optical endoscope having an insertion unit for insertion into a body cavity;
   a television camera mounted to the optical endoscope, and having an image pickup device built therein for picking up an image of a portion to be observed by the optical endoscope;
   a wireless transmitter associated with the television camera for transmitting an image information signal of the image by wireless;
   an information display portion provided in the endoscope to display frequency information of a transmission frequency of the wireless transmitter;
   an information reading device for reading the frequency information of the information display portion;
   a wireless receiver for receiving the image information signal transmitted from the wireless transmitter;
   a reception frequency setting unit for tuning a reception frequency of the wireless receiver to the transmission frequency of the image information signal transmitted from the wireless transmitter by using the frequency information read by the information reading device; and
   a video processing circuit for processing the image information signal received by the wireless receiver to provide an output signal for display.

5. An endoscope apparatus comprising:
   a first endoscope having a first insertion unit for insertion into a body cavity and a first image pickup element for picking up an image of a portion to be observed;
   a second endoscope having a second insertion unit for insertion into the body cavity, and a television camera mounted to the second endoscope and having a second image pickup element built therein for picking up an image of a portion to be observed;
   first and second wireless transmitters, associated with the first endoscope and the television camera, respectively, for transmitting image information signals of the images picked up by the first endoscope and the television camera, respectively, by wireless at respectively different transmission frequencies;
   first and second information display portions, provided in the first endoscope and the television camera, respectively, to display frequency information of transmission frequencies of the first and second wireless transmitters;
   at least one information reading device capable of reading the frequency information of the first and second information display portions;
   at least one wireless receiver capable of receiving the image information signals transmitted from the first and second wireless transmitters, respectively;
   at least one reception frequency setting unit for tuning a reception frequency of the wireless receiver to the transmission frequency of each of the image information signals transmitted from the first and second wireless transmitters by using the frequency information read by the information reading device; and
   at least one video processing circuit for processing the first and second image information signals received by the wireless receiver to provide respective output signals for display.

6. A medical system comprising:
   a medical observation device having an optical system for observing a living body;
   a television camera mounted to the medical observation device and having an image pickup device built therein for picking up an image of a portion to be observed by the medical observation device;
   a wireless transmitter associated with, the television camera, for transmitting an image information signal of the image by wireless;
   an information display portion provided in the medical observation device to display frequency information of a transmission frequency of the wireless transmitter;

an information reading device for reading the frequency information of the information display portion;

a wireless receiver for receiving the image information signal transmitted from the wireless transmitter;

a reception frequency setting unit for tuning a reception frequency of the wireless receiver to the transmission frequency of the image information signal transmitted from the wireless transmitter by using the frequency information read by the information reading device; and at least one video processing circuit for processing the image information signal received by the wireless receiver to provide an output signal for display.

7. A medical system according to claim 6, wherein the medical observation device to which the television camera is mounted is an optical endoscope.

8. A medical system according to claim 6, wherein the medical observation device to which the television camera is mounted is a microscope for operation.

* * * * *